United States Patent [19]

Koch et al.

[11] 3,973,269

[45] Aug. 3, 1976

[54] SHUTTER MECHANISM

[75] Inventors: Carl Koch, Stetten; Karl Gfeller, Schaffhausen, both of Switzerland

[73] Assignee: Sinar AG Schaffhausen, Switzerland

[22] Filed: Feb. 26, 1975

[21] Appl. No.: 553,160

Related U.S. Application Data

[63] Continuation-in-part of Ser. No. 489,089, July 29, 1974.

[30] Foreign Application Priority Data

Feb. 26, 1974 Switzerland.......................... 2729/74

[52] U.S. Cl............................... 354/234; 354/235; 354/250; 354/252; 354/258
[51] Int. Cl.².......................................... G03B 9/08
[58] Field of Search .................. 354/26, 29, 38, 50, 354/51, 60 R, 234, 235, 250, 252, 258

[56] References Cited
UNITED STATES PATENTS

| | | | |
|---|---|---|---|
| 3,595,153 | 7/1971 | Saul..................................... | 354/234 |
| 3,704,659 | 12/1972 | Low et al............................ | 354/234 |
| 3,791,278 | 2/1974 | Biber et al.......................... | 354/235 |

*Primary Examiner*—Russell E. Adams, Jr.
*Attorney, Agent, or Firm*—Watson, Cole, Grindle & Watson

[57] ABSTRACT

An electrically controlled shutter device for a photograhic camera. The shutter device includes a shutter element which is mounted for movement for opening and closing a light admitting aperture of the camera. A drive mechanism causes the movement of the shutter element between its respective positions. An external trigger control provides for initiation of the opening and closing of the aperture during the exposure operation. A position monitoring mechanism is associated with the shutter element for providing a signal in dependence upon the shutter element being located in a predetermined position. A control mechanism is coupled to the output of the position monitoring mechanism and controls the operation of the shutter device as a function of the signal provided by the position monitoring mechanism and as a function of the signals from the external trigger control.

21 Claims, 21 Drawing Figures

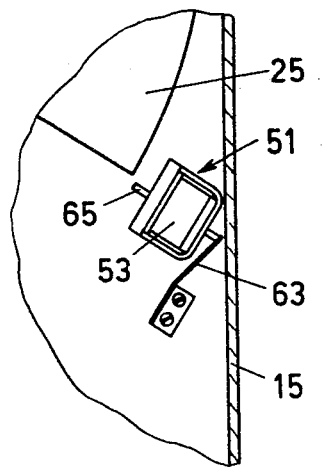
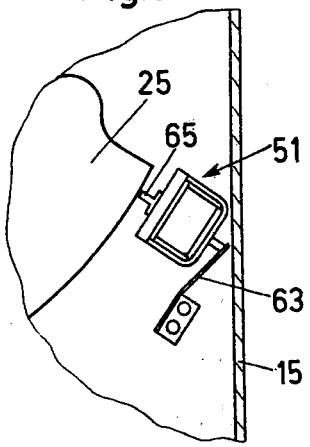
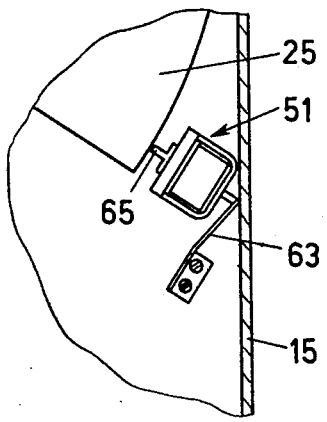
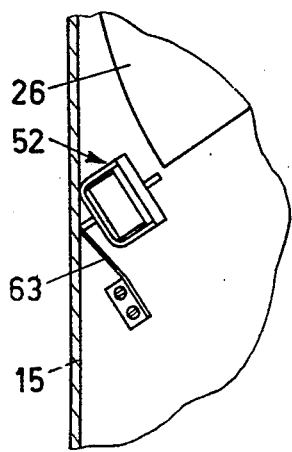
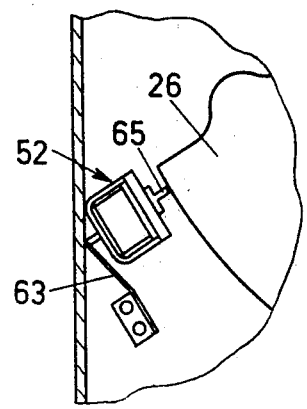

SHUTTER MECHANISM

RELATED APPLICATION

The present application is a continuation-in-part of application Ser. No. 489,089, filed July 29th, 1974.

BACKGROUND OF THE INVENTION

The present invention relates to an electrically controlled shutter mechanism for a photographic camera having a movable shutter element for opening or closing a light admitting aperture and a driving mechanism for moving the shutter element.

More specifically the invention relates to a shutter device for a photographic camera, especially for a medium or large format camera equipped for viewing with a focusing screen. The shutter is of the type having two shutter elements, each movable between a first and second rest position, for opening or closing the aperture and further having drive devices for the shutter elements which, for an exposure, are capable of moving the shutter elements sequentially with a set time interval in the same direction from the first to the second rest position.

An example of such a shutter device is the so-called focal plane shutter having rigid shutter elements, which, for the exposure of photographic materials, are capable of being sequentially moved with an arbitrary difference in time so that the leading shutter element opens the aperture for an exposure and the delayed shutter element then closes the aperture.

Several previously known designs of such shutter devices required relatively complicated mechanisms for controlling the drive devices for the shutter elements. Since the shutter elements must be returned to their initial position in a partially overlapping arrangement, following each shutter operation, so as to prevent an exposure during that process, the shutter elements also overlap in their initial position prior to the next shutter operation. For that reason the initial positions of the two shutter elements differ; and the difference in time between the start of the leading shutter element and the start of the delayed shutter element must deviate, when the shutter is activated, from the desired exposure time for that certain amount of time which transpires until the overlap of the shutter elements has been overcome. This reason, and others, inhibit the provision of a shutter device with exact, predetermined exposure times, especially when the aperture is relatively large, for example, when its diameter exceeds 50 mm, and when exposure times of 1/100th second or shorter are also required.

SUMMARY OF THE INVENTION

An object of the present invention is to provide an improved shutter mechanism of the mentioned type.

Another object of the present invention is to increase the operational safety and functional precision of the shutter mechanism as compared to previously known designs and also to simplify the operation of the electrical control of the shutter mechanism.

These objectives are achieved by providing a shutter mechanism constructed in accordance with the present invention. For this purpose, the shutter mechanism is provided with at least one stationary operable position monitor which is assigned to the shutter element and is actually tripped at a predetermined position of the shutter element so as to provide an appropriate electrical signal. The position monitor is connected with an electrical control mechanism, which controls the operation of the shutter mechanism as a function of both signals given off by the position monitor and external signals for opening or closing the light admitting aperture or for triggering a process of exposure.

The operation of the position monitor can be controlled by a photo-electric, magnetic-inductive or capacitive system.

A braking mechanism, which can be actuated and stopped, is operatively coupled to the shutter mechanism. Thus, the control mechanism controls the operation of the braking mechanism as a function of a signal given off by the position monitor in response to movement of the shutter element in at least one predetermined position.

Two drive mechanisms can be operatively coupled with the shutter element for alternately driving the shutter element from a first into a second position or from the second into the first position. In this situation, two position monitors are connected with the control mechanism and are associated with the shutter element. The control mechanism thus controls the drive mechanism by signals alternately given off by the position monitors for the opposite movement of the shutter element.

The shutter mechanism can be provided with two shutter elements, with which the drive mechanisms are respectively associated. In this case, during an exposure operation, the shutter elements move in succession with the same selected time interval from a first into a second predetermined position. At least one position monitor, which is connected with the control mechanism, as well as at least one braking mechanism, which can be controlled for braking the corresponding shutter element, are associated with each shutter element. Thus, the control mechanism starts up the braking mechanism assigned to a shutter element as a function of signals given off by the position monitor with the movement of one or the other shutter element into its second predetermined position. It is also possible to provide at least two position monitors, connected with the control mechanism, to be associated with the shutter elements as well as a second pair of drive mechanisms, by means of which the shutter elements can be moved in the opposite direction from the second into the first predetermined position likewise in succession with the same selected time interval for one exposure operation. The control mechanism also controls the drive mechanism by signals alternately given off by the position monitors for opposite movements of the shutter elements, whereby the total of four drive mechanisms are controlled in cyclic succession.

In all of the embodiments of the invention, provision can be made that after such start-up of the drive mechanism or one of the drive mechanisms, the control mechanism turns off the drive mechanism as a function of a signal given off by the position monitor, as soon as the driven shutter element has moved a predetermined distance. The respective shutter element then can continue running into the opposite final position alone or under the influence of its kinetic energy.

BRIEF DESCRIPTION OF THE DRAWINGS

FIGS. 8 to 12 show various phases of movement of the brake devices and the shutter elements according to the invention.

DESCRIPTION OF THE PREFERRED EMBODIMENTS

Figure 1:
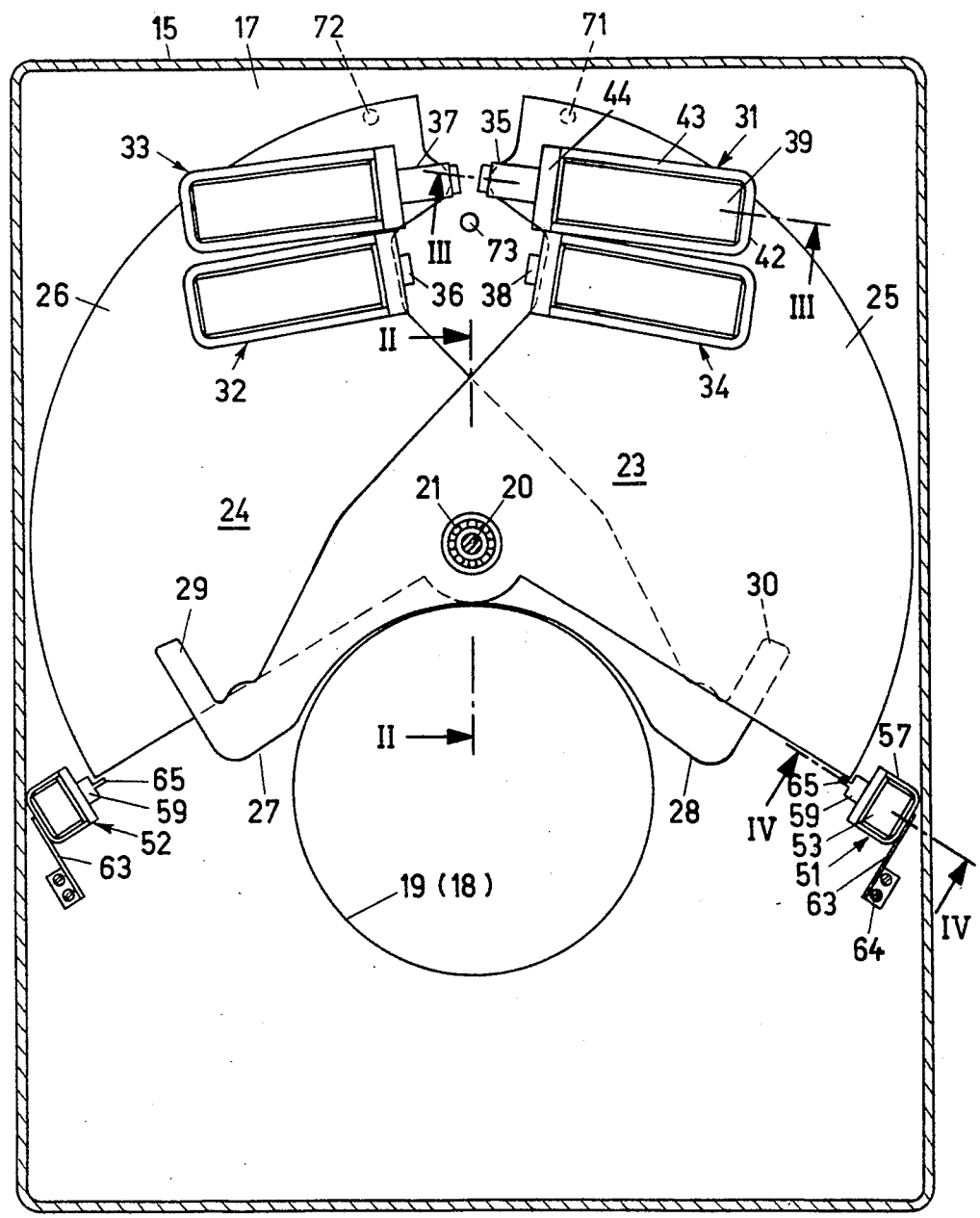
FIG. 1 shows a shutter device according to the invention with the front wall of the shutter housing removed and the aperture fully opened.
Figure 2:
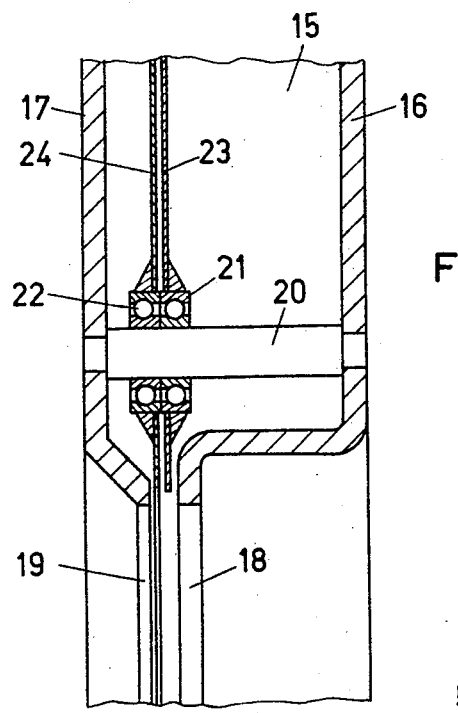
FIG. 2 is a larger scale part-sectional view taken along lines II—II of FIG. 1 and shows the swivel mount of the shutter elements.

The shutter device shown in FIGS. 1 and 2 for a large-format screen camera includes a shallow housing 15 having a front wall 16 and a rear wall 17, each of which has an opening 18 and 19 for the aperture. The diameter of the openings 18 and 19 may, for example, be in the order of magnitude of 75 mm, although the shutter device is also suitable for apertures with lesser or greater diameters. An axle 20 is secured with its ends in the front wall 16 and rear wall 17 and supports two ball bearings 21 and 22 having outer rings independently rotatable of one another. Shutter elements 23 and 24, each of which includes a flat disk, are attached to the outer ring of ball bearings 21 and 22. The common rotational axis 20 of ball bearings 21 and 22 is perpendicular to the plane of each shutter element 23 and 24, and the two shutter elements are arranged close to one another, spaced by only a relatively small distance in the direction of the rotational axis of the ball bearings, as can be seen in FIG. 2.

Figure 5:
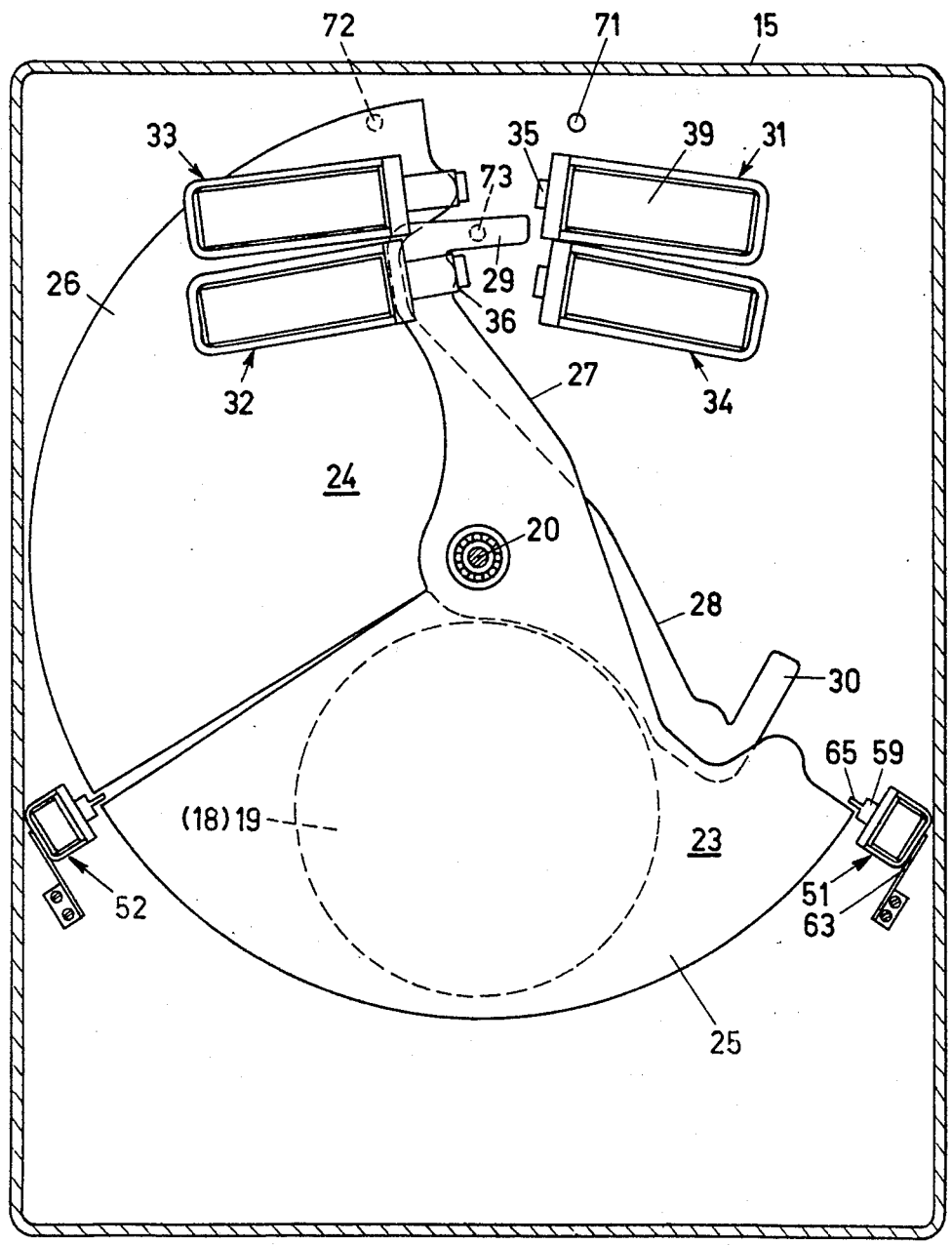
FIG. 5 is a view, similar to FIG. 1, of the shutter device with a closed aperture.
Figure 6:
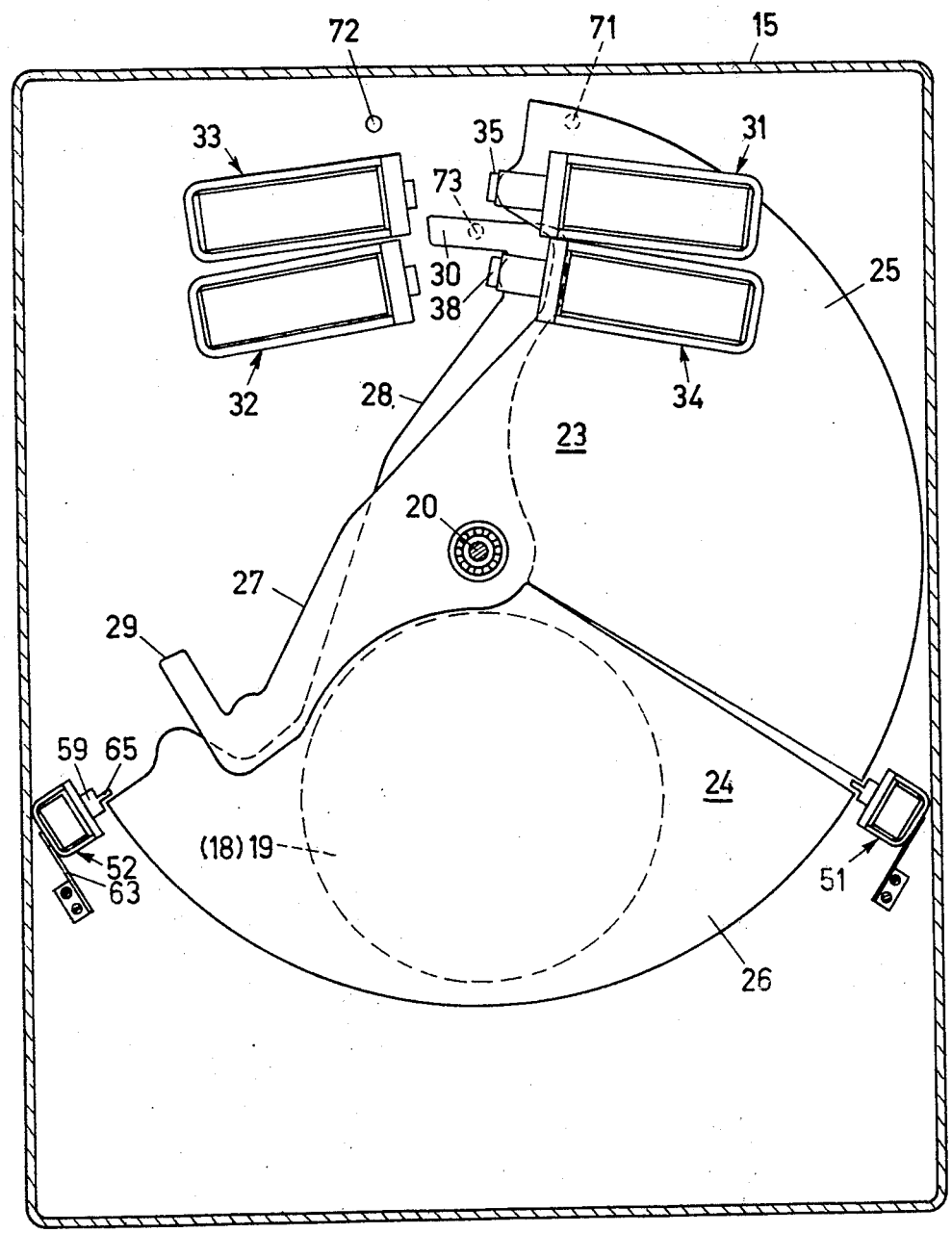
FIG. 6 is a view similar to FIG. 5, with the shutter elements shown in the opposite position.

Each of the shutter elements 23 and 24 respectively includes a circular sector-shaped shutter leaf 25 and 26 and an arm 27 and 28 extending outwardly from the vertex of its shutter leaf in a direction away from axle 20. Each arm has an angled leg 29, 30, respectively, as shown in FIG. 1. The shape and size of each shutter leaf 25, 26 are such that the shutter leaf is capable of totally covering aperture 18, 19 and thus closing the aperture if either shutter element 23 or 24 is swivelled into one of its rest positions as shown in FIG. 5 or FIG. 6. Both shutter elements 23 and 24, however, may also be swivelled into another rest position in which they totally expose aperture 18, 19 as shown in FIG. 1. It may be advantageous to attach, to arms 27 and 28, weight-balancing pieces of material (not shown) which will cause the center of gravity of each shutter element to nearly coincide with the rotational axis of the appropriate ball bearing 21 or 22.

Figure 3:
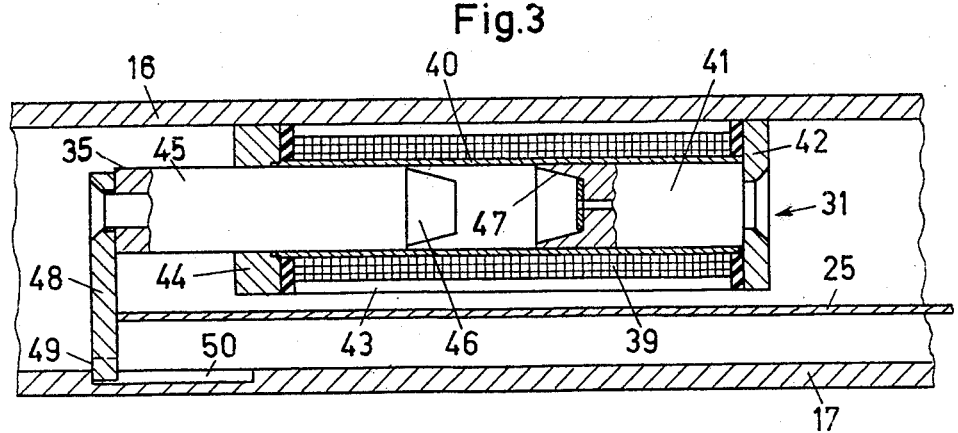
FIG. 3 shows, also in a larger scale, an individual drive device in section taken along lines III—III of FIG. 1.

In order to permit movement of shutter elements 23 and 24 from one into the other of the noted rest positions, each shutter element has an associated pair of drive mechanisms 31, 32 and 33, 34, respectively. These drive devices include solenoids, respectively provided with percussion armatures 35, 36, 37 and 39. All of the solenoid drive devices are identical, with the details of a typical drive device 31 being shown in FIG. 3. An electrical winding 39 is provided around a hollow spool body 40 into which a ferromagnetic core 41 projects. The outer end of core 41 is firmly connected with a center stem 42 of a U-shaped yoke 42, 43 of ferromagnetic material. Legs 43 of this yoke extend along opposite outer edges of winding 39 to the opposite end of spool body 40 where they are connected to each other by a ferromagnetic end plate 44. End plate 44 has an opening through which a rod-like ferromagnetic main component 45 of the movable armature extends. Stationary parts 39 through 44 of the solenoid are affixed to wall 16 of shutter housing 15 in some suitable manner. End part 46 of armature part 45, which lies within the hollow space of spool body 40 is in the shape of a truncated cone and may engage a depression 47 within solid core 41 when winding 39 is energized. Depression 47 is of the same geometric shape as end part 46. The end portion of armature part 45 which extends outwardly from spool body 40, is linked with a striker plate 48 which, in turn, has a projection 49 that engages a notch 50 in wall 17 of shutter housing 15. Notch 50 extends parallel to the direction of movement of armature 45 and its length is so dimensioned that it limits the travel of the armature to a desired range. In particular, notch 50 prevents armature part 45 from slipping out of spool body 40, when projection 49 strikes one end (the left one in FIG. 3) of notch 50. Striker plate 48 is intended to work with a portion of the edge of one shutter leaf 25 in order to give the latter a sudden drive impulse. As noted earlier, the remaining drive devices 32, 33 and 34 are completely identical with drive device 31 as described with reference to FIG. 3.

The arrangement of the described electromagnetic drive devices 31 to 34 and the shape of shutter elements 23 and 24 are related to one another. Armature 35 of drive device 31 only cooperates with an edge portion of shutter leaf 25 in order to effect a clockwise movement of shutter element 23, if this shutter element is in an open position (FIG. 1). Armature 36 of drive device 32 only cooperates with an edge portion of arm 27 in order to effect a counterclockwise movement of shutter element 23 if this shutter element is in a closed position (FIG. 5). Armature 37 of drive device 33 only cooperates with an edge portion of shutter leaf 26 in order to effect a counterclockwise movement of shutter element 24 if this shutter element is in an open position (FIG. 1). Armature 38 of drive device 34 only cooperates with an edge portion of arm 28 in order to effect a clockwise movement of shutter element 24 if this shutter element is in a closed position (FIG. 6). A more detailed explanation of the mode of operation of the shutter device will be presented later.

Two electromagnetic brake devices 51 and 52 (FIGS. 1, 5 and 6) are provided for the purpose of locking shutter elements 23 and 24, respectively, in their open position. Braking devices 51 and 52 also effect a bounceless stopping of shutter elements 23 and 24 when transferred between the open and closed positions. Both of the braking devices are of identical design. Brake device 51 is explained in detail below with reference to FIG. 4.

Figure 4:
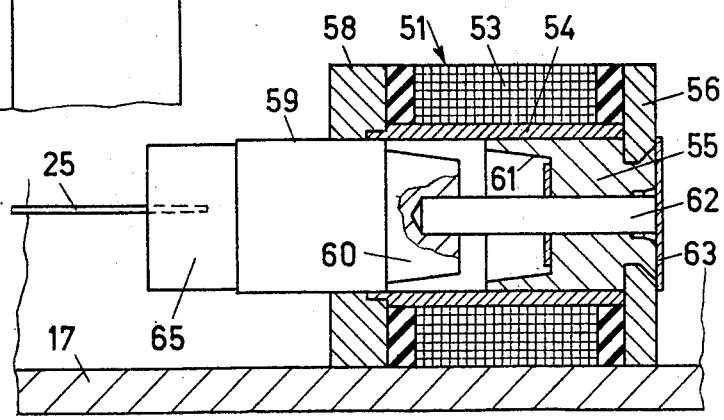
FIG. 4 shows, in a still larger scale, an individual brake device in section taken along lines IV—IV of FIG. 1.

An electrical winding 53 is provided around a hollow spool body 54 into which projects a ferromagnetic core 55. The outer end of core 55 is firmly connected with a center stem 56 of a U-shaped yoke made of a ferromagnetic material, the legs 57 (FIG. 1) of which extend on opposite sides outwardly of winding 53 up to the opposite end of spool body 54, and are connected there by an end plate 58 consisting of ferromagnetic material. End plate 58 has an opening through which extends a rod-like, movable armature 59 made of ferromagnetic material. End portion 60 of armature 59, located within the hollow space of spool body 54, is in the shape of a truncated cone and is capable of entering a depression 61 within core 55 when winding 53 is energized. End portion 60 and depression 61 have corresponding geometric shapes. A non-magnetic rod 62, e.g. of a plastic material, is inserted coaxially in end portion 60 of armature 59. Rod 62 penetrates through a bore-hole in core 55 and is capable of being axially moved together with armature 59. The free end of rod 62 rests against a leaf spring 63 which is fastened to wall 17 of shutter housing 15 by means of a carrier 64 (FIG. 1). Stationary parts 53 and 58 of the brake devices are attached to the same wall in some suitable manner. The end portion of armature 59 which extends outwardly from spool body 54 is designed as a brake and locking part 65. Part 65 is in the shape of a plate disposed at a right angle to the planes of shutter elements 23 and 24 as can be seen in FIGS. 1 and 4. As previously noted, the other brake device 52 is completely identical in design to brake device 51 as described above.

Figure 13:
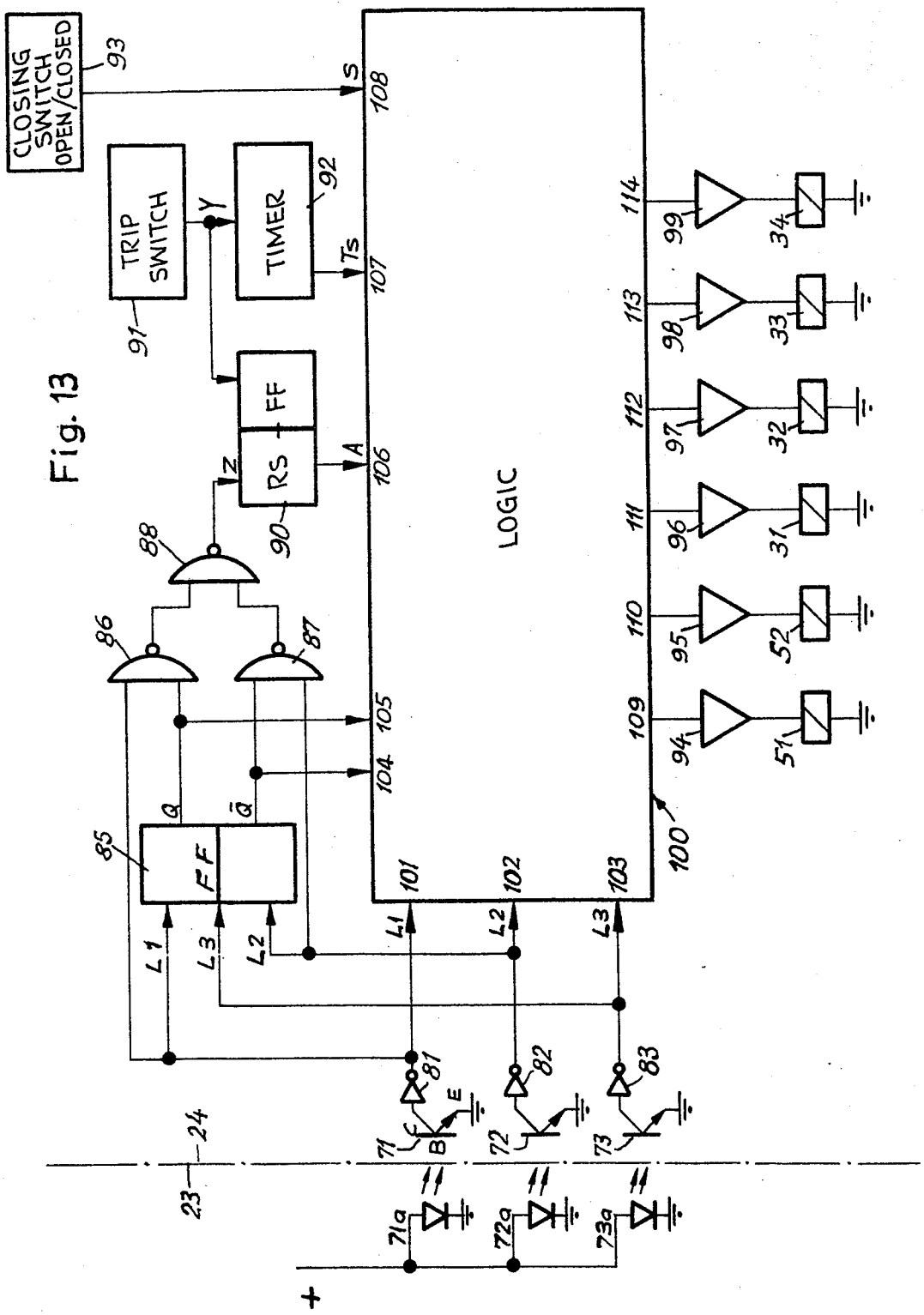
FIG. 13 is a schematic diagram of the control circuitry for the shutter mechanism.

Three position monitors 71, 72 and 73 are shown as being associated with the shutter elements 24 and 25, (FIGS. 1, 5, 6 and 7). These position monitors can be actuated without any physical contact by the shutter elements. The position monitors can be photoelectrical converters, e.g. phototransistors, which are covered or exposed by shutter elements 23 and 24 according to their position. The first position monitor 71 is arranged so that it is covered by shutter element 23, when it assumes its open position (FIG. 1). The second position monnitor 72 is arranged in such a way that it is covered by shutter element 24, when it assumes its open position (FIG. 1). The third position monitor 73 is located in such a position that it is either covered by extension 29 of shutter element 23 when this assumes its closed position (FIG. 5), or is covered by extension 30 of shutter element 24 when it assumes its closed position (FIG. 6). Thus, both position monitors 71 and 73 are associated with shutter element 23, whereas both position monitors 72 and 73 are associated with shutter element 24. A light source is alloted to each of the photoelectric position monitors 71, 72 and 73, e.g. in the form of a light emitting diode 71a, 72a or 73a (FIG. 13). Each light emitting diode is set up in such a manner that it illuminates the light-sensitive surface of the corresponding position monitor, so long as the latter is not covered by one of the associated shutter elements 23 and 24.

A schematic illustration of the electronic control of the shutter mechanism is shown in FIG. 13. Photoelectric position monitors 71, 72 and 73 are each connected to a respective signal inverter 81, 82 and 83. The outlets of the inverter are connected by conductors L1, L2 and L3 with three inputs 101, 102 and 103 of an electronic logic control circuit 100. The construction of logic control circuit 100 is described in more detail below with reference to FIG. 14. The conductors L1 and L2 are each connected to a steady state input of a flip-flop 85 whose trigger input is connected to conductor L3. The flip-flop 85 provides two outputs Q and $\overline{Q}$ and is designed in a known manner such that each time with the occurrence of a descending flank of the potential on conductor L3, output Q assumes and contains the actually prevailing potential of the conductor L1 and the output $\overline{Q}$ assumes and contains the actually prevailing potential of conductor L2, until the next descending flank of the potential occurs on conductor L3.

A NAND-gate 86 has one of its two inputs connected to conductor L1 and the other of its inputs connected to output $\overline{Q}$ of flip-flop 85. In a similar manner, a second NAND-gate 87 has one of its two inputs connected to conductor L2 and the other of its inputs connected to output Q of flip-flop 85. The outputs of both NAND-gates 86 and 87 are connected with the inputs of another NAND-gate 88, whose output is connected by a conductor Z to the reset input of a flip-flop 90. The other input of flip-flop 90 is connected via a conductor Y with an arbitrarily actuating trip switch 91, which is to be actuated by the photographer, when he wishes to trigger an exposure. The output of flip-flop 90 is connected via a conductor A with an input 106 of logic circuit 100.

Conductor Y is also connected to a timer 92, or to a time-signal transmission, which in turn is connected via a conductor Ts with another output 107 of logic circuit 100. Timer 92 is so designed that it can be adjusted for a selectable illumination time. Timer 92 is initiated by an electrical signal provided by trip switch 91 and, after a time interval corresponding to the selected exposure time, it gives off an output signal to conductor Ts. Another input 108 of logic circuit 100 is connected via a conductor S with a second arbitrarily actuated switch 93, with the aid of which the photographer can open and then close the aperture of the shutter element so as to examine an image on the ground glass plate of the camera. Switch 93 also can be connected in a known manner with the slide-in units of the cassettes for the light-sensitive photographic material, so that the aperture is automatically closed with insertion of a cassette and is automatically opened when removing the cassette.

Logic circuit 100 provides six outputs 109 to 114. The magnet windings of brake mechanisms 51 and 52 are coupled to outputs 109 and 110, through power amplifiers 94 and 95, respectively. The magnet windings of drive mechanisms 31, 32, 33 and 34, which serve to move shutter elements 23 and 24, are coupled to the other outputs 111 to 114 through power amplifiers 96, 97, 98 and 99, respectively.

Figure 14:
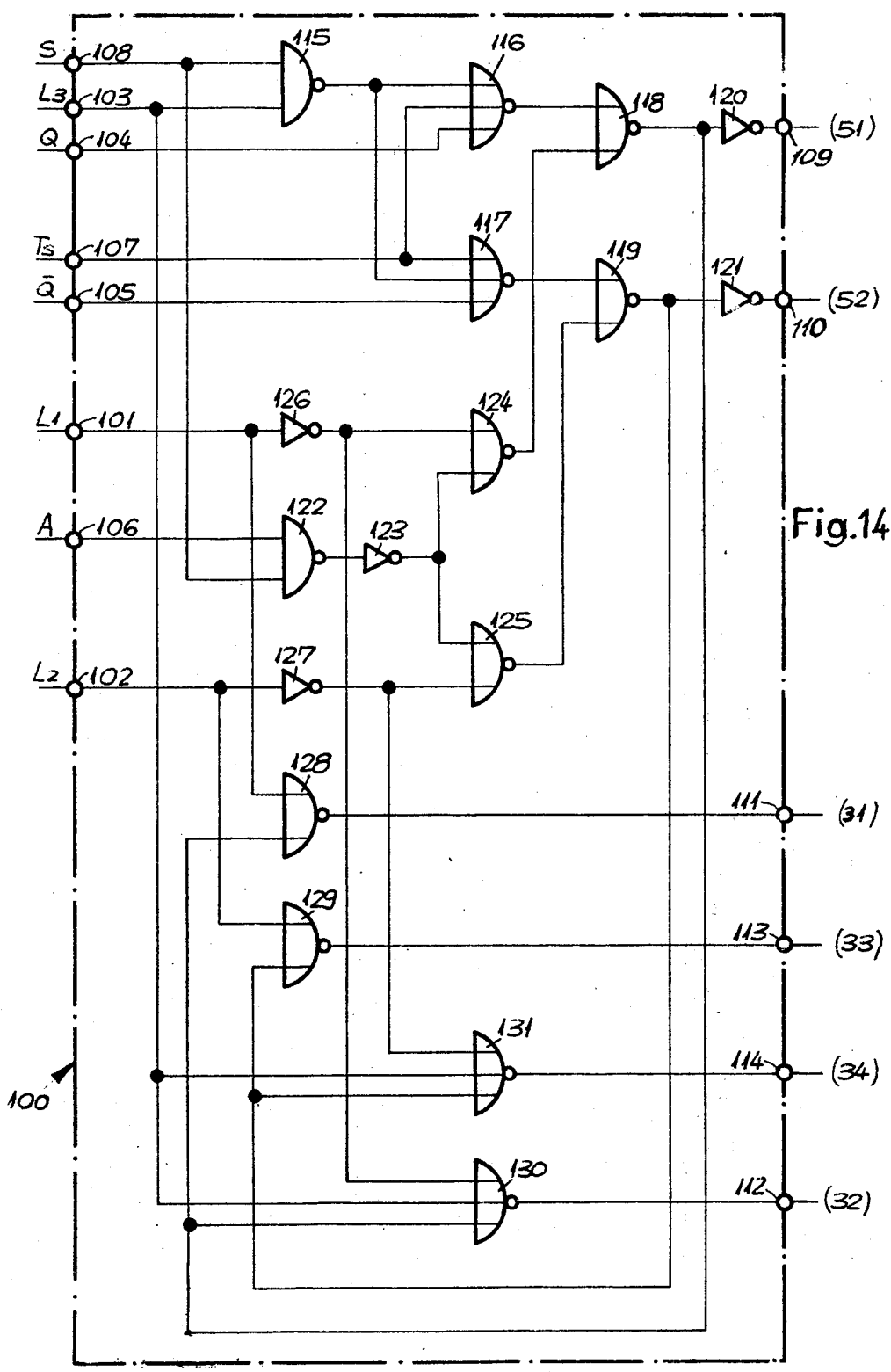
FIG. 14 is a schematic diagram of the logic circuit shown in FIG. 13.

A schematic diagram of logic circuit 100 is shown in FIG. 14. Inputs 103 and 108 of logic circuit 100 are connected with the inputs of a NAND-gate 115, whose output is connected with the first inputs of two NOR-gates 116 and 117. Inputs 104 and 105 of the logic circuit are each connected to a second input of NOR-gates 116 and 117, respectively. Input 107 of the logic circuit is connected with third inputs of NOR-gates 116 and 117. The outputs of NOR-gates 116 and 117 are each connected with inputs of other NOR-gates 118 and 119, whose outputs are each connected through an inverter 120 or 121 to logic output 109 or 110, respectively. Input 106 along with input 108 of logic circuit 100 are connected with the inputs of a NAND-gate 122, whose output is coupled through an inverter 123 with inputs to two NOR-gates 124 and 125. The other inputs of NOR-gates 124 and 125 are each coupled through an inverter 126 or 127 to logic input 101 or 102, respectively. The outputs of NOR-gates 124 and 125 are each connected with inputs of NOR-gates 118 and 119. Logic inputs 101 and 102 are also connected with the inputs of NOR-gates 128 and 129, whose outputs are connected directly to logic outputs 111 and 113, respectively. The other inputs of NOR-gates 128 and 129 are each connected with the output of NOR-gates 118 and 119. Finally, two further NOR-gates 130 and 131 are provided, each of which has three inputs. The first inputs of NOR-gates 130 and 131 are connected to outputs of inverters 126 and 127. The second inputs of NOR-gates 130 and 131 are connected with the outputs of NOR-gates 118 and 119. Finally, the third inputs of both NOR-gates 130 and 131 are connected with logic input 103. The outputs of NOR-gates 130 and 131 are each directly connected with one of the outputs 112 and 114 of logic circuit 100.

The operation of the shutter mechanism will now be described below.

In FIG. 1, both shutter leaves 25 and 26 are in open positions so that aperture 18, 19 is open. This position of the shutter device permits the viewing of the focusing screen in the camera for focusing the image to be photographed. Time delay exposures also may be made with the shutter device in this position. All electromagnetic windings of drive devices 31 to 34 and of brake devices 51 and 52 are de-energized. Armatures 36 and 38 of drive devices 32 and 34 are in a withdrawn position, whereas armatures 35 and 37 of drive devices 31 and 33 are in an extended position, since they have been pushed into that position by shutter leaves 25 and 26. Armatures 59 of brake devices 51 and 52 have been pushed into the extended position by leaf springs 63, in which position the brake and locking part 65 of brake device 51 locks shutter element 23 in its position and part 65 of brake device 52 locks shutter element 24 in its position, as shown in FIG. 1. The two photoelectric position monitors 71 and 72 are covered by leaves 25 and 26, while light strikes on the third position monitor 73. Accordingly, a potential lies on conductor L3, while conductors L1 and L2 do not have any voltage. The output Q of flip-flop 85 is voltage-free, whereas a potential lies on output $\overline{Q}$. Conductors A and Y conduct voltage, while conductors Ts and S are voltageless.

When aperture 18, 19 is to be closed, the photographer actuates switch 93, which causes a potential to be placed on conductor S and fed to input 108 of logic circuit 100. The result is that potentials occur on outputs 109 and 111 of the logic circuit, which cause the excitation of the magnetic windings of brake mechanism 51 and drive mechanism 31 through amplifiers 94 and 96. With the excitation of winding 53 of brake mechanism 51, armature 59 is drawn towards leaf spring 63 into the body of the coil 54, thereby disengaging braking and locking element 65 from shutter leaf 25, as shown in FIG. 8. With energization of winding 39 of drive mechanism 31, armature 35 is attracted thereby causing plate 48 of the armature to exert a blow-like drive impulse to shutter leaf 25. Shutter element 23 is increasingly accelerated until armature 35 has been completely attracted, after which shutter element 23 continues to move only under the influence of its mass moment of inertia. Thus, shutter element 23 moves with a constant speed in a clockwise direction, until aperture 18, 19 is completely covered by shutter leaf 25. At this instant, since shutter leaf 25 has exposed photoelectric position monitor 71, thereby enabling light to fall on it, a potential appears on conductor L1 and on input 101 of logic circuit 100. Input 101 which is coupled to NOR-gate 128 thus causes output 111 of logic circuit 100 to be cut off thereby turning off the energization of winding 39 and drive mechanism 31.

Immediately before shutter element 23 reaches its final position, as shown in FIG. 5, extension 29 of arm 27 covers position monitor 73. At this moment, the voltage is cut off from conductor L3. This results in a potential appearing on output Q of flip-flop 85 while the potential on output $\overline{Q}$ disappears. This in turn causes a step voltage on conductor Z. However, the same potential still remains on conductor A. The potential change has an effect on conductors L3 and $\overline{Q}$ and thus on inputs 103 and 104, so that the voltage output 109 is cut off and the stimulation of winding 53 of brake mechanism 51 is turned off. Under the influence of leaf spring 63, armature 59 is thrust outwardly, whereby braking and locking element 65 is pressed against the outer edge of shutter leaf 25, as shown in FIG. 9. This has the effect of braking shutter element 23. At approximately the same time, when extension 29 begins to cover position monitor 73, arm 27 moves against armature 36 of armature drive mechanism 32. Armature 36 is pulled outwardly from mechanism 32 by arm 27, whereby the energy required to accelerate armature 36 is drawn from shutter element 23. Shutter element 23 thereby experiences a delay, which along with the effect of braking mechanism 51 provides cushion free and vibration free stopping of shutter element 23 when moved into its closed position as shown in FIG. 5. As soon as the closed position of shutter element 23 has been fully reached, braking and closing part 65 of braking mechanism 51 snaps outwardly under the influence of leaf spring 63 behind the trailing edge of shutter leaf 25, thereby locking shutter element 23 in its closed position.

Figure 15:
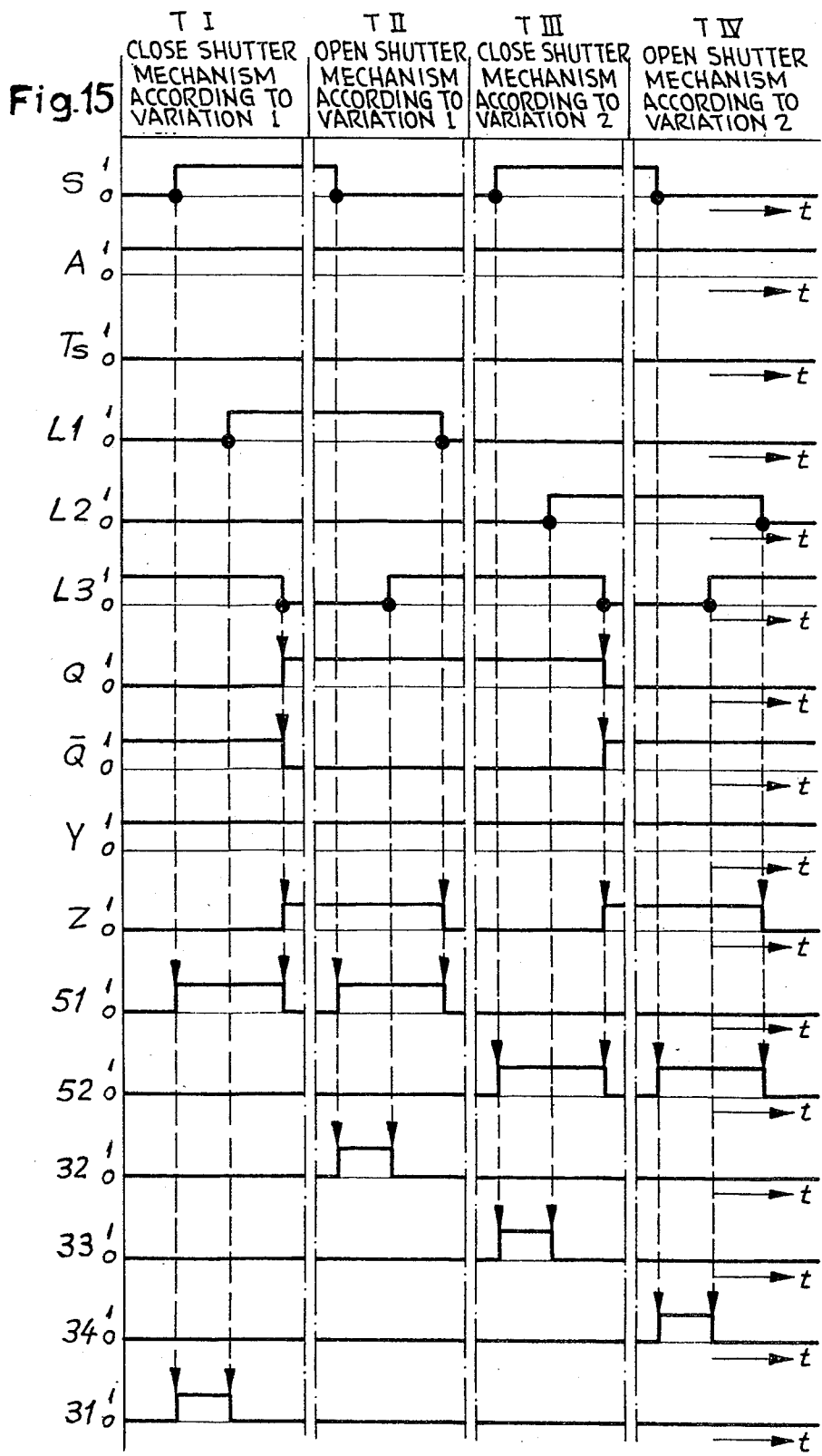
FIG. 15 illustrates a time chart of the various electrical signals at various states of operation of the circuit shown in FIG. 13.

The variations with respect to time of the potentials appearing during the described closing procedure of the aperture and during the stimulation of the magnetic windings of braking mechanism 51 and drive mechanism 31 is shown in FIG. 15 in the first time section Tl. With the use of vertically running, dashed arrows, whose start is marked by a period and whose end is marked by a point, in FIG. 15, it can be seen where the effects actually proceed and what the results are. Through the use of similar charts in FIGS. 16 to 21, the other functions of the shutter mechanism will be subsequently described.

When aperture 18, 19 is to be opened up again, whether it be for a long-time exposure or for merely examining the ground glass plate, the photographer actuates switch 93, which thereby causes conductor S and input 108 of logic circuit 100 to become voltage free. The result is that electrical potentials appear on outputs 109 and 112 of the logic circuit, which output signals via amplifiers 94 and 97 stimulate the windings of braking mechanism 51 and drive mechanism 32 during period TII shown in FIG. 15. Stimulation of windings 53 of brake mechanism 51 causes armature 59 to be drawn toward the influence of leaf spring 63 and braking and locking part 65, thereby releasing shutter leaf 25. The stimulation of the winding of drive mechanism 32 has the effect that armature 36 is attracted thereby exerting a blow-like drive impulse on arm 27. This drive impulse to arm 27 subjects shutter element 23 to an increasing acceleration, until armature 36 has been completely attracted. Shutter element 23 is subsequently moved only under the influence of its mass moment of inertia with constant speed in a counterclockwise direction, until aperture 18, 19 is completely exposed by shutter leaf 25. At this moment, since movement of extension 29 has now exposed photoelectric position monitor 73, a potential appears on conductor L3 and on input 103 of logic circuit 100. This results in logic input 112 becoming voltage free and the stimulation of the winding of drive mechanism 32 being turned off.

Immediately before shutter element 23 reaches its open position, as shown in FIG. 1, shutter leaf 25 covers photoelectric position monitor 71, which causes the potential to disappear on conductor L1. This has the effect that the potential also disappears on conductor Z, which, however, remains without further influence, and that output 109 of logic circuit 100 is voltage free and the stimulation of winding 53 of brake mechanism 51 is turned off. Under the influence of leaf spring 63, the armature 59 is now thrust outwardly from spool 54 and braking and locking part 65 is pressed against the peripheral edge of the shutter leaf, as shown in FIG. 10. In this manner, shutter element 23 experiences a braking force. At about the same time, when the shutter leaf begins to cover position monitor 71, the front edge of shutter leaf 25 moves against armature 35 of drive mechanism 31. This causes armature 35 to be thrust outwardly from spool 40, whereby the energy needed to accelerate armature 35 is drawn from shutter element 23. Thus, shutter element 23 experiences a delay, which in addition to the effect of braking mechanism 51, has the result of a cushion and vibration free stopping of the shutter element with the movement into its open position, as shown in FIG. 1. As soon as shutter element 23 has completely reached its open position, braking and locking part 65 of braking mechanism 51 snaps outwardly under the influence of leaf spring 63 behind the trailing edge of shutter leaf 25, thereby locking shutter element 23 in its open position.

A subsequent closing of aperture 18, 19, e.g. at the end of a long-time exposure, is accomplished with the use of the other shutter leaf 26. When the photographer actuates switch 93, a potential appears on conductor S and on input 108 of logic circuit 100, thereby causing potentials to appear on outputs 110 and 113 of the logic circuit (these signals are shown in period TIII in FIG. 15). These potentials are fed via amplifiers 95 and 98 to the windings of braking mechanism 52 and drive mechanism 33 for energizing such windings. With energization of the windings of braking mechanism 52, braking and locking part 65 of this braking mechanism is completely drawn into spool 54 thereby disengaging from shutter leaf 26, as shown in FIG. 11. Energization of the windings of drive mechanism 33 causes armature 37 to be attracted and exerts a sudden drive impulse on shutter leaf 26. This causes shutter element 24 to be increasingly accelerated, until armature 37 is completely attracted, after which shutter element 24 merely under the influence of its mass moment of inertia continues to move with constant speed in a counterclockwise direction, until aperture 18, 19 is covered, as shown in FIG. 6. As soon as shutter leaf 26 has exposed position monitor 72, a potential appears on conductor L2 which in turn causes the potential to disappear on output 113 of logic circuit 100 and for the energization of the windings of drive mechanism 33 to be shut off.

Immediately before shutter element 24 reaches its closed position shown in FIG. 6, extension 30 of arm 28 covers photoelectric position monitor 73, thereby causing the potential on conductor L3 to disappear. The result is that a potential appears on output Q of flip-flop 85, the potential disappears on output $\overline{Q}$ and a potential appears on conductor Z, which however remains without effect. The change in the potentials on outputs Q and $\overline{Q}$ cause the potential to disappear on output 110 of logic circuit 100 and subsequently the excitation of the windings of brake mechanism 52 to be turned off. Under the influence of the leaf spring 63, now the brake and lock part 65 of brake mechanism 52 is pressed against the peripheral edge of shutter leaf 26, as shown in FIG. 12. This causes a braking of shutter element 24. At approximately the same time, when extension 30 of arm 28 begins to cover position monitor 73, arm 28 moves against armature 38 of drive mechanism 34. This causes armature 38 to be thrust outwardly from the spool, whereby the energy required to accelerate armature 38 is drawn from shutter element 24. This causes shutter element 24 to exeperience a delay, which in addition to the effect of brake mechanism 52, results in a cushioning and vibration free stopping of the shutter element 24 when moving into its closed position according to FIG. 6. As soon as shutter element 24 has completely reached its closed position, braking and locking part 65 of braking mechanism 52 acting under the influence of leaf spring 63, snaps outwardly into a position behind the trailing edge of shutter leaf 26, thereby locking shutter element 24 in its closed position.

When aperture 18, 19 is to be opened again, shutter element 24 is moved back from its closed position as represented in FIG. 6 into open position as shown in FIG. 1. To accomplish this operation, the photographer actuates switch 93 such that the potential disappears on conductor S. This in turn causes potentials to appear on outputs 110 and 114 of logic circuit 100, which by means of amplifiers 95 and 99, respectively, cause the excitation of the windings of brake mechanism 52 and of the windings of drive mechanism 34 (these potentials are shown in period TIV in FIG. 15). With the excitation of the windings of brake mechanism 52, braking and locking part 65 disengages from shutter leaf 26. With the excitation of the windings of drive mechanism 34, armature 38 is attracted, which exerts a sudden drive impulse on arm 29 of shutter element 24 causing it to be increasingly accelerated, until armature 38 has been completely attracted. Afterwards, shutter element 24 continues to move merely under the influence of its mass moment of inertia with a constant speed in a clockwise direction, until aperture 18, 19 is completely exposed. At this moment, since extension 30 has exposed photoelectric position monitor 73, a potential appears on conductor L3 which in turn causes the potential to disappear on output 114 of logic circuit 100 and subsequently causes the excitation of the windings of drive mechanism 34 to be shut off.

Immediately before shutter element 24 reaches its open position as shown in FIG. 1, shutter leaf 26 covers photoelectric position monitor 72. This causes the potential on conductor L2 to disappear, which has the effect that the potentials also disappear on conductor Z and on output 110 of logic circuit 100 and consequently the excitation of the windings of braking mechanism 52 are shut off. Under the influence of leaf spring 63, braking and locking part 65 of braking mechanism 52 is pressed against the peripheral edge of the shutter leaf, thereby braking shutter element 24. Almost simultaneously, the leading edge of shutter leaf 26 moves against armature 37 of drive mechanism 33. This causes armature 37 to be thrusted outwardly from the spool, whereby the energy needed to accelerate armature 37 is drawn from shutter element 24. This causes shutter element 24 to experience a delay, which in addition to the effect of the braking mechanism, causes the cushioning and vibration free stopping of the shutter element when moving into its open position, as shown in FIG. 1. As soon as the shutter element has reached its open position, braking and locking part 65 of braking mechanism 52 snaps outwardly into a position behind the trailing edge of shutter leaf 26, thereby locking shutter element 24 in its open position.

It is apparent that aperture 18, 19, therefore, can be closed in two different ways, namely either by shutter leaf 25 (variation 1, as shown in FIG. 5) or by shutter leaf 26 (variation 2, as shown in FIG. 6). The photographer, however, need not worry about this fact, since the changing potentials on outputs Q and $\bar{Q}$ of flip-flop 85 automatically take care of this in dependence upon photoelectric position monitors 71, 72 and 73. Accordingly, the closing of aperture 18, 19 is first accomplished with shutter leaf 25, then with shutter leaf 26 and then again with shutter leaf 25. Drive mechanisms 31, 32, 33 and 34 are actuated in cyclical sequence, in order to bring about in succession the closing according to variation 1, the opening, the closing according to variation 2, the opening etc. of the aperture. By changing the potentials on the flip-flop outputs Q and $\bar{Q}$, the drive mechanisms are actually reversed for the opposite movement drive, that is they are prepared.

Automatic exposure operations, in which closure of aperture 18, 19 is automatically controlled in dependence upon timer 92 after a pre-selected exposure time, presume that the aperture is closed beforehand by actuating switch 93, as previously described. In the following, it is explained how the time course of the electrical and mechanical operations take place for different periods of illumination. In this consideration, a distinction must be made, however, as to whether the aperture is closed before the start of the exposure by shutter leaf 25 (variation 1) or by shutter leaf 26 (variation 2).

Figure 16:
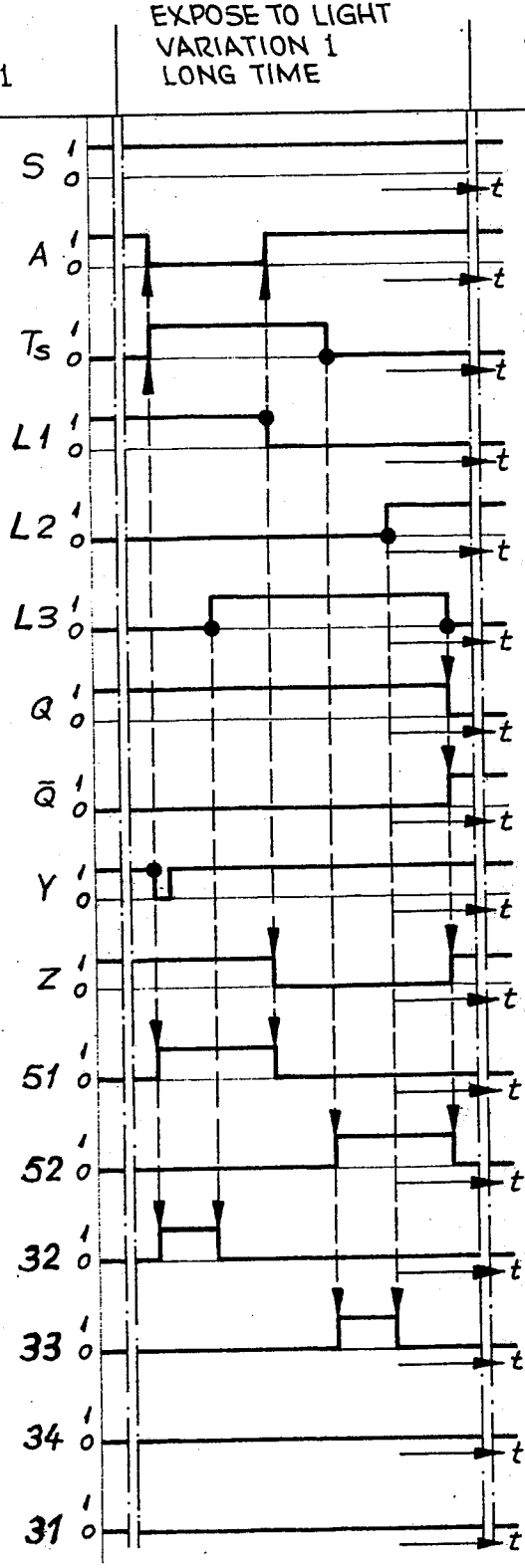
FIG. 16 is a chart similar to that of FIG. 15, of the electrical signals during a long-time exposure operation.

First, it is assumed that aperture 18, 19 is closed according to variation 1 (FIG. 5) by shutter leaf 25 and timer 92 is adjusted for a relatively long exposure time, which exceeds the time which the shutter element, 23 or 24, requires for a movement from one into the other of its final rest positions. As is illustrated in FIG. 16, an electrical potential initially lies on each of the conductors S, A, L1, Y and Z. To trigger the exposure, the photographer actuates trip switch 91, which causes the temporary interruption of the potential on conductor Y. The period of time of the interruption is not important. As soon as the potential disappears on conductor Y, the operation of timer 92 is initiated, whereby a potential appears on the conductor Ts and on input 107 of logic circuit 100. At the same time, the disappearance of the potential on conductor Y causes the flip-flop to operate and the potential to disappear on conductor A and on input 106 of logic circuit 100. This results in potentials appearing on outputs 109 and 112 of logic ciruict 100, which by means of amplifiers 94 and 97 cause the energization of the windings of brake mechanism 51 and of drive mechanism 32, respectively. Braking and locking element 65 of braking mechanism 51 disengages from the shutter leaf and a sudden drive impulse is provided to shutter element 23 by armature 36 of drive mechanism 32, so that shutter element 23 is moved in a clockwise direction (FIG. 5). At this moment, since extension 29 of arm 27 has exposed photoelectric position monitor 73, a potential appears on conductor L3, which in turn causes the potential to disappear on output 112 of logic circuit 100 and subsequently the excitation of the windings of drive mechanism 32 to be shut off. The shutter element 23, however, continues to move under the influence of the mass moment of inertia, until aperture 18, 19 is completely exposed.

Immediately before shutter element 23 has reached its open position (FIG. 1), shutter leaf 25 covers photoelectric position monitor 71, thereby causing the potential on conductor L1 to disappear. The result is that first the potential disappears on conductor Z, which switches flip-flop 90, so that a potential again appears on conductor A, and second that the potential disappears on output 109 of logic circuit 100, thereby causing the energization of the windings of braking mechanism 51 to be shut off. Under the influence of leaf spring 63, braking and locking part 65 of braking mechanism 51 is now pressed against the peripheral edge of shutter leaf 25, thereby locking shutter element 23 into its open position. Aperture 18, 19 is now opened, shown in FIG. 1.

At this moment, since the exposure time set on timer 92 has elapsed, the timer causes the potentials to disappear on conductor Ts and on input 107 of logic circuit 100. This results in the appearance of potentials on outputs 110 and 113 of logic circuit 100, which via amplifiers 95 and 98, energize the windings of brake mechanism 52 and of drive mechanism 33. Braking and locking part 65 of braking mechanism 52 is disengaged from shutter leaf 26 and armature 37 of drive mechanism 33 imparts a sudden drive impulse to shutter element 24, so that the shutter element is moved in the counterclockwise direction. When shutter leaf 26 has exposed photoelectric position monitor 72, a potential appears on conductor L2, which causes the potential to disappear on output 113 of logic circuit 100 and then the excitation of the windings of drive mechanism 33 to be turned off. Shutter element 24, however, continues to move under the influence of its mass moment of inertia, until it completely closes aperture 18, 19, as shown in FIG. 6. Immediately before shutter element 24 has reached its closed position, extension 30 of the arm covers photoelectric position monitor 73, thereby causing the potential on conductor L3 to disappear. The result is that on outlet $\bar{Q}$ of flip-flop 85 the potential disappears and potentials appear on output Q of flip-flop 85 and on conductor Z. The potential also disappears on output 110 of logic circuit 100, thereby causing the excitation of the windings of braking mechanism 52 to be turned off. Thus, under the influence of leaf spring 63, braking and locking part 65 of braking mechanism 52 is pressed against the peripheral edge of shutter leaf 26, thereby braking shutter element 24 as it moves into its closed position. Aperture 18, 19 is now closed according to variation 2, as shown in FIG. 6, and the exposure is completed.

Figure 17:
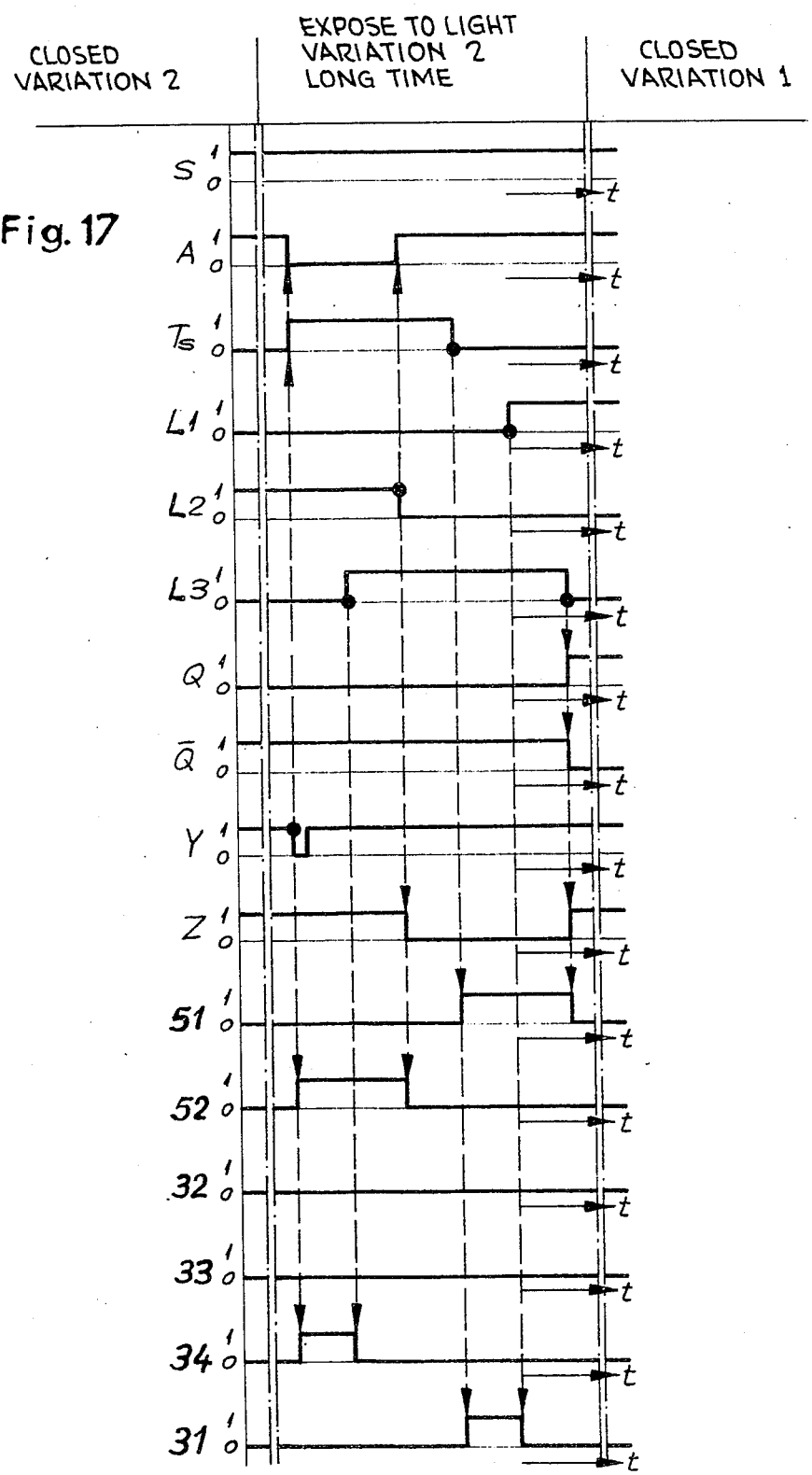
FIG. 17 is a time chart of the electrical signals with a subsequent long-time exposure.

When aperture 18, 19 according to variation 2 (FIG. 6) is closed by shutter leaf 26 in accordance with variation 2, the potentials on conductors L1 and L2, which are influenced by position monitors 71 and 72, as well as the potentials on outputs Q and Q̄ of flip-flop 85 are interchanged, as compared to the case where the aperture is closed by the shutter leaf 25 in accordance with variation 1. Consequently with a following exposure, the roles of braking mechanisms 51 and 52 are interchanged and two other drive mechanisms 34 and 31 are operated in succession with the time interval set on timer 92, in order to first move shutter element 24 into its open position and then the other shutter element 23 in a clockwise direction into its final closed position. The variation in the different potentials and excitations are represented in FIG. 17 for the case where the preselected exposure time set on the timer is longer than the period of time which each of the shutter elements needs for a movement from one into the other final position.

It is possible to set a shorter exposure time period on timer 92, in which the period is still longer than the period of time for the excitation of the windings of one of the individual drive mechanisms 31, 32, 33 or 34, but is shorter than the period of time which each of the shutter elements 23 and 24 requires for a movement from the one into the other final position. In this case, when trip switch 91 is actuated, the result is the course of the potentials and excitations represented in FIGS. 18 and 19, depending on whether aperture 18, 19 is closed before according to variation 1 by shutter leaf 25 or according to variation 2 by shutter leaf 26.

Figure 7:
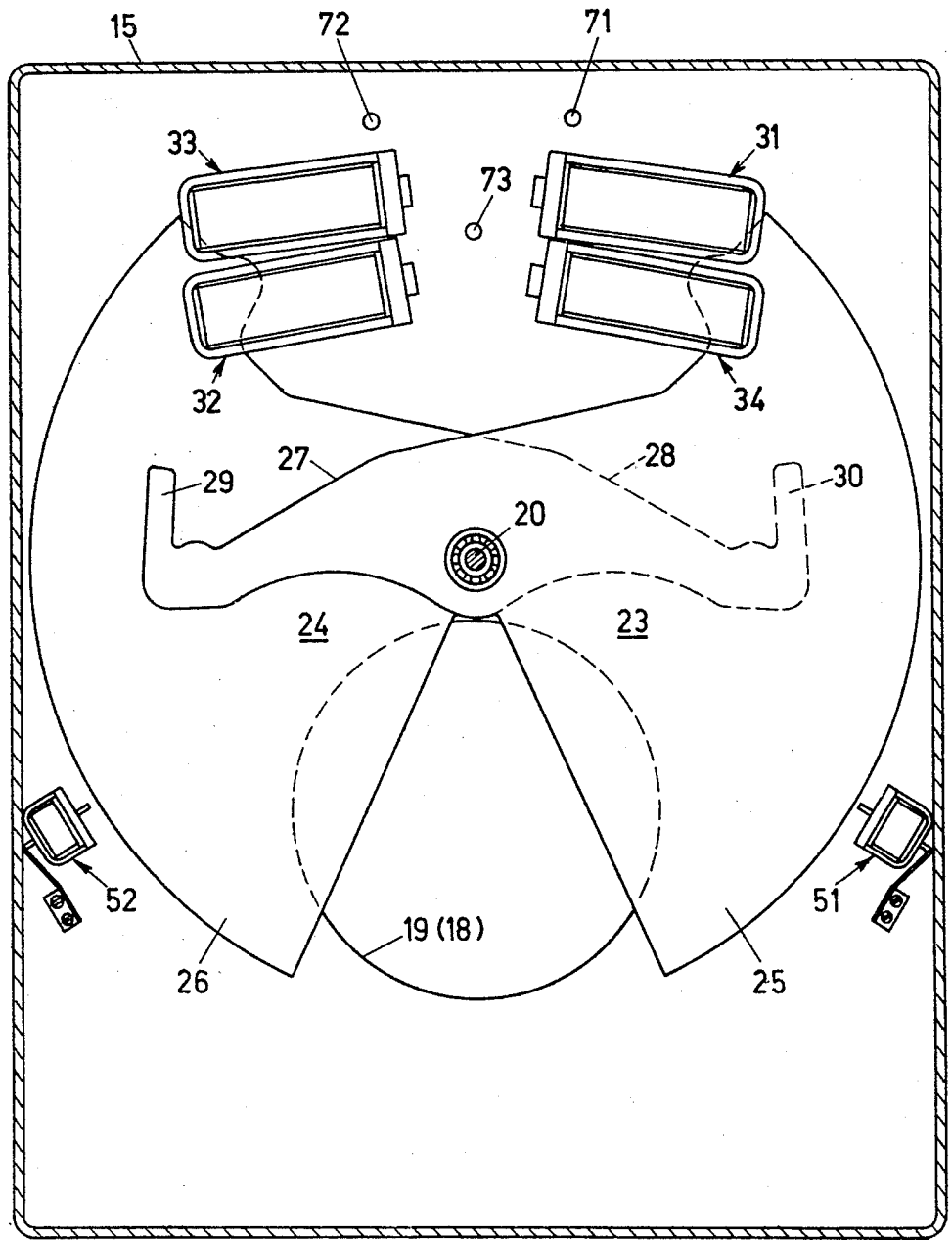
FIG. 7 shows the FIG. 5 shutter device during a short time exposure.
Figure 18:
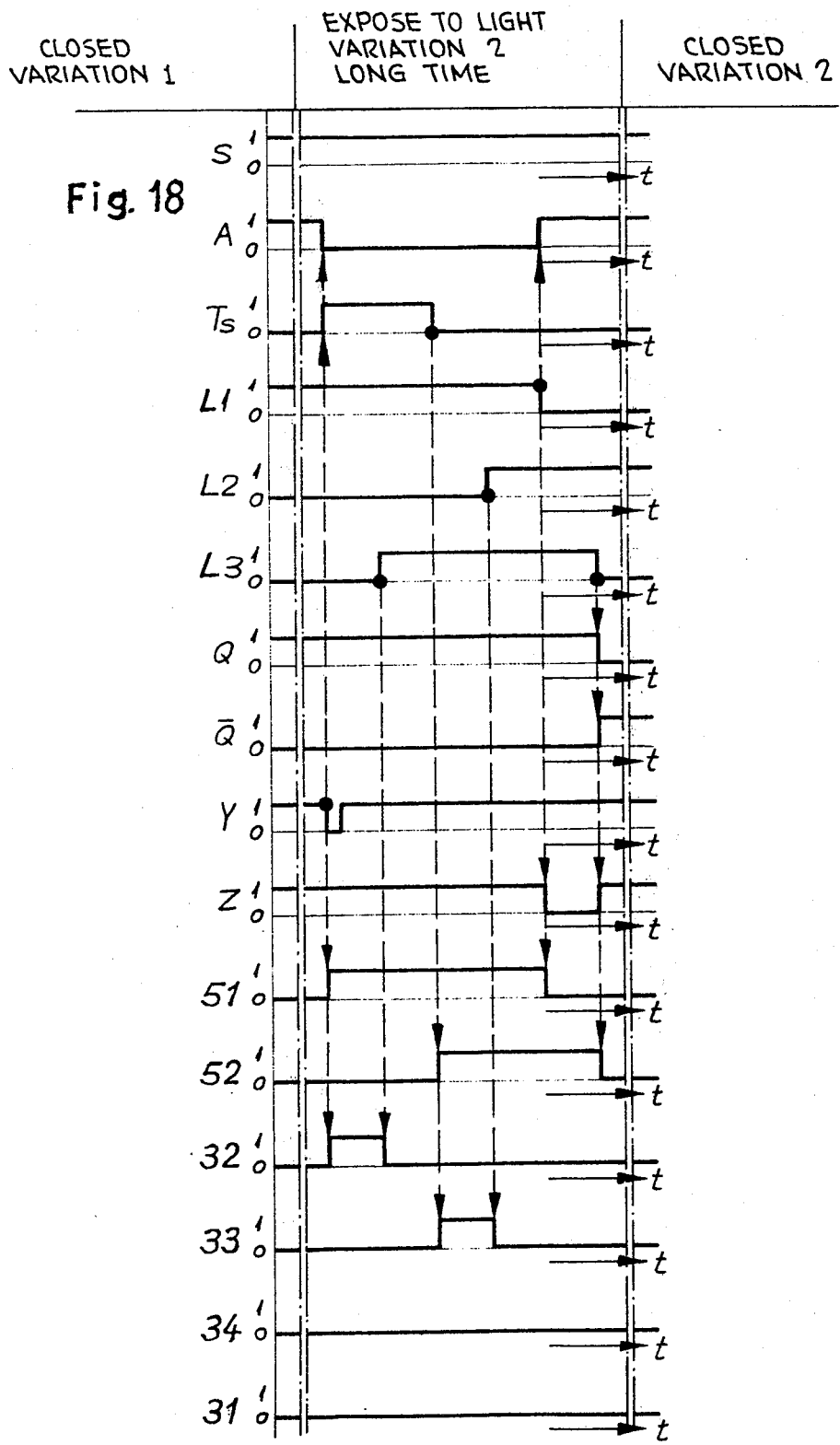
FIG. 18 shows a time chart of the electrical signals during a short-time exposure operation.

FIG. 18 presents the case where the aperture is first closed according to variation 1. When the photographer actuates trip switch 91, the potential on conductor Y is interrupted for a moment, thereby initiating the operation of timer 92 simultaneously causing flip-flop 90 to change states. A potential appears on conductor Ts at the output of timer 92, and the potential on conductor A at the output of flip-flop 90 disappears. This results in potentials appearing on outputs 109 and 112 of logic circuit 100, which via amplifiers 94 and 97 causes excitation of the windings of brake mechanism 51 and drive mechanism 32, respectively. This causes braking and locking part 65 of the braking mechanism to disengage from shutter leaf 25 and a sudden impulse to be imparted to shutter element 23 by armature 36 of the drive mechanism, so that shutter element 23 is moved in a counterclockwise direction. As soon as extension 29 of arm 27 has exposed photoelectric position monitor 73, a potential appears on conductor L3, which causes the excitation of the windings of drive mechanism 32 to be shut off. Shutter element 23, however, continues to move under the influence of its mass moment of inertia. In this moment, since the adjusted exposure time on timer 92 has elapsed, the potential disappears on conductor Ts. This causes the appearance of potentials on outputs 110 and 113 of the logic circuit, which via amplifiers 95 and 98 energize the windings of brake mechanism 52 and drive mechanism 33. This results in braking and locking part 65 of braking mechanism 52 disengaging shutter leaf 26 and a sudden drive impulse being imparted to shutter element 24 by means of armature 37 of drive mechanism 33, so that shutter element 24 is moved in the same sense as shutter element 23. When shutter leaf 26 has exposed photoelectric position monitor 71, a potential appears on conductor L2, which causes the excitation of the windings of drive mechanism 33 to be shut off. Shutter element 24, however, continues to move under the influence of its mass moment of inertia. The second shutter element 24, therefore, is set in motion, before the first shutter element 23 has reached its final position, as shown in FIG. 7.

Immediately before shutter element 23 has reached its open position, shutter leaf 25 covers photoelectric position monitor 71, thereby causing the potential on conductor L1 to disappear. The result is that the potential on conductor Z disappears, which causes the switching of flip-flop 90, so that a potential again appears on conductor A. In addition, the disappearance of the potential on conductor L1 causes the excitation of the windings of brake mechanism 51 to be shut off. Under the influence of leaf spring 63, braking and locking part 65 or braking mechanism 52 is pressed against the peripheral edge of shutter leaf 25, thereby braking shutter element 23 as it moves into its open position. Immediately before the second shutter element 24 has reached its closed position, projection 30 of arm 28 covers photoelectric position monitor 73 causing the potential on conductor L3 to disappear. The result is that the potential disappears on the output Q of flip-flop 85, potentials appear on output Q̄ and on conductor Z, and the excitation of the windings of the second braking mechanism 52 is shut off. By means of the braking and locking part 65 of braking mechanism 52, the second shutter element 24 is likewise braked as it moves into a closed position. Thus the exposure operation is completed.

Figure 19:
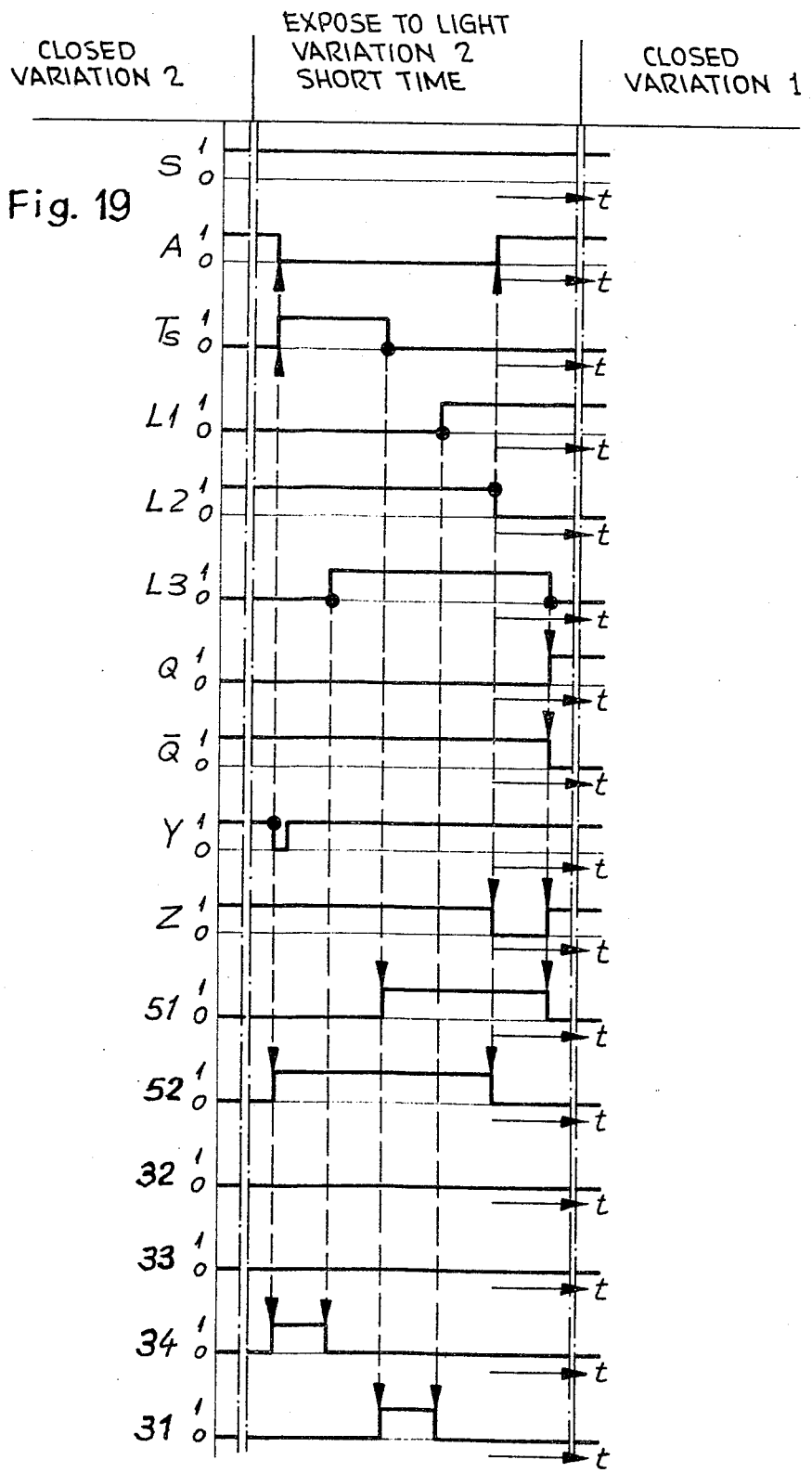
FIG. 19 shows a time chart of the electrical signals with a subsequent short-time exposure.

FIG. 19 presents an analogous exposure operation for the case where prior to actuating trip switch 91, the aperture is closed by shutter leaf 26 according to variation 2 (FIG. 6).

Figure 20:
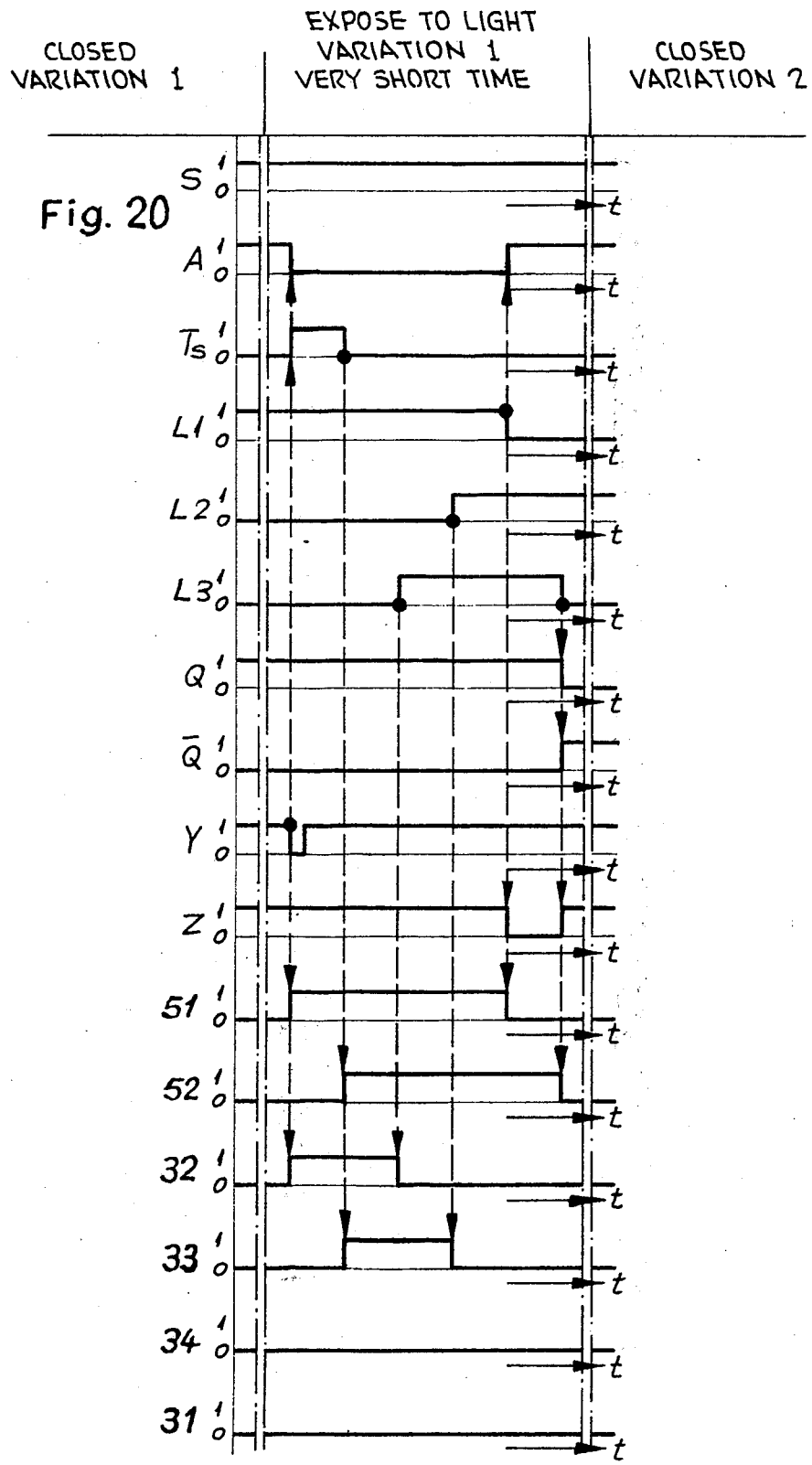
FIG. 20 is a time chart of the electrical signals during a very short-time exposure operation.
Figure 21:
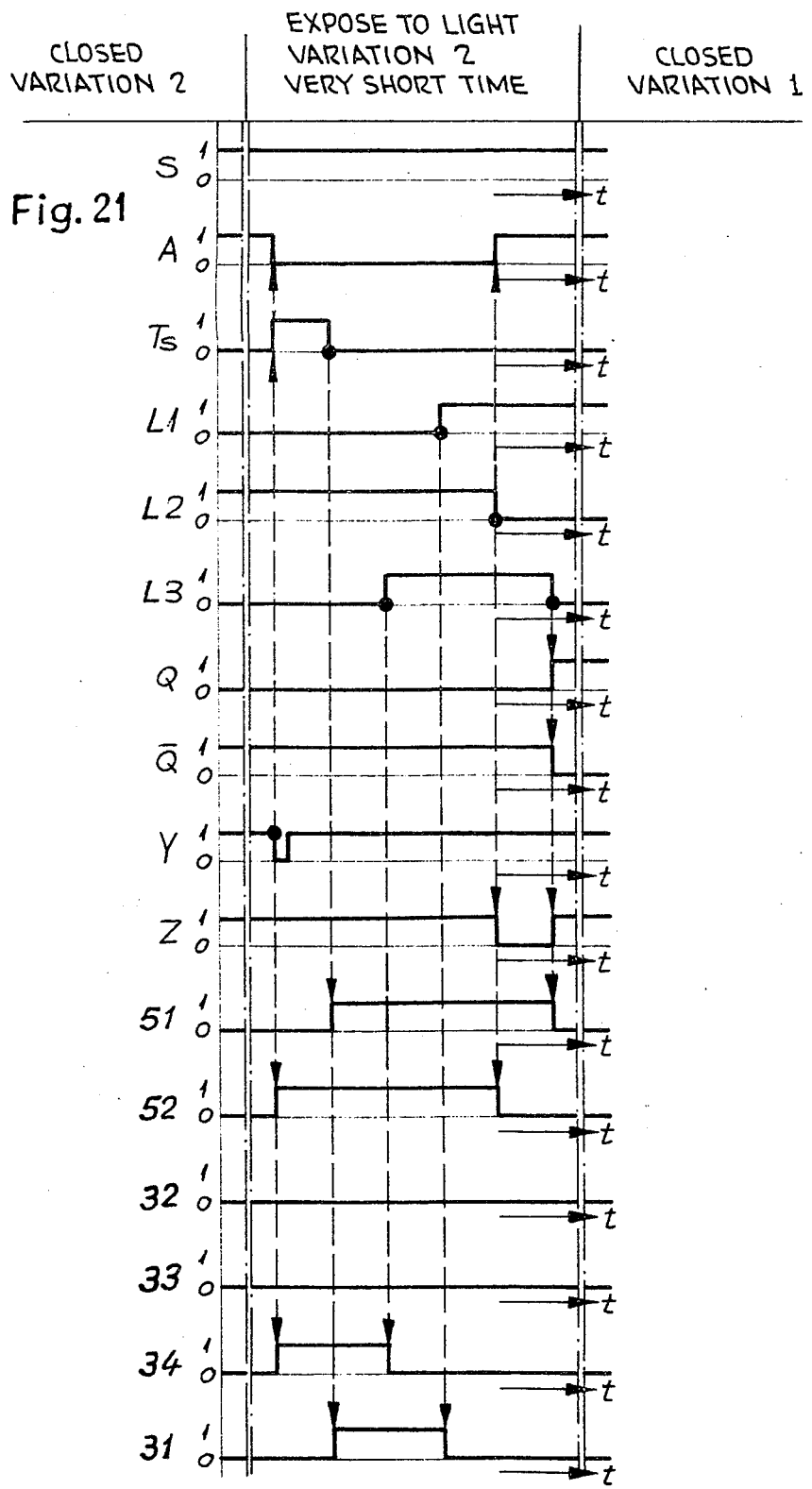
FIG. 21 is a time chart of the electrical signals with a subsequent very short-time exposure operation.

When an even shorter exposure time period is set on timer 92, which period is shorter than the actual period for the excitation of the windings of one of the drive mechanisms 31, 32, 33 and 34, the result is the series of potential changes and excitations during the exposure as presented in FIGS. 20 and 21. FIG. 20 presents the case where the aperture is first closed by the shutter leaf 25 according to variation 1 (FIG. 5). When the photographer actuates trip switch 91, the potential on conductor Y is interrupted for a moment, thereby causing initiation of timer 92 and simultaneously switching of flip-flop 90. A potential appears on conductor Ts at the outlet of timer 92, and the potential on conductor A at the output of flip-flop 90 disappears. The result is that potentials appear on outputs 109 and 112 of logic circuit 100, which via amplifiers 94 and 97 causes the excitation of the windings of brake mechanism 51 and drive mechanism 32. Braking and locking part 65 of braking mechanism 51 disengages from shutter leaf 25 and a sudden drive impulse is imparted to shutter element 23 by armature 36 of drive mechanism 32, so that the shutter element is moved in a counterclockwise direction (FIG. 5). As soon as the exposure time set on the timer has elapsed, the potential disappears on conductor Ts. This causes potentials to appear on outputs 110 and 113 of logic circuit 100, which via amplifiers 95 and 98 cause the excitation of the windings of the second braking mechanism 52 and drive mechanism 33. In turn, the braking and locking part of braking mechanism 52 disengages shutter leaf 26 and a sudden drive impulse is imparted to the second shutter element 24 by the armature of drive mechanism 33, so that shutter element 24 is moved in the same sense as shutter element 23.

As soon as projection 29 of arm 27 of the first shutter element 23 has exposed photoelectric position monitor 73, a potential appears on conductor L3 which causes the excitation of the windings of drive mechanism 32 to be turned off. Shutter element 23, however, continues to move under the influence of its mass moment of inertia. At this moment, since shutter leaf 26 of the second shutter element 24 has exposed the photoelectric position monitor 71, a potential appears on conductor L2, which causes the excitation of the windings of drive mechanism 33 to also be turned off. The second shutter element 24, however, also continues to move under the influence of its mass moment of inertia. Immediately before the first shutter element 23 has reached its open position, shutter leaf 25 covers photoelectric position monitor 71, thereby causing the potential on conductor L1 to disappear. The result is that the potential on conductor Z disappears, which causes the switching of flip-flop 90, so that a potential again appears on conductor A. The disappearance of the potential on conductor L1 also causes the excitation of the windings of brake mechanism 51 to be shut off thereby resulting in the braking of shutter element 23 as it moves into its open position. Immediately before the second shutter element 24 reaches its closed position, extension 30 of arm 28 covers position monitor 73, thereby causing the potential on conductor L3 to disappear. This results in the potential disappearing on output Q of the flip-flop, potentials appearing on output Q̄ and on the conductor Z and the excitation of the windings of the second brake mechanism 52 being shut off. The second shutter element is likewise braked as it moves into its final position. The exposure operation is thus ended.

FIG. 20 shows an analogous exposure for the case where before actuating trip-switch 91, aperture 18, 19 is closed by shutter leaf 25, in accordance with variation 2 (FIG. 6).

From the preceding description it is evident that the movement, i.e., the drive and the braking of shutter elements 23 and 24 is controlled as a function of the electrical signals provided by position monitors 71, 72 and 73 after the presentation of an external command, e.g., to open or close aperture 18, 19 by switch 93 or to trigger an automatically operating exposure by trip switch 91. Position monitors 71, 72 and 73 not only ensure during a movement operation of the shutter elements from one final position into the opposite position that the assigned drive and braking mechanisms, 31 to 34 and 51 and 52, are turned off or on at the most practical moment, but in collaboration with the switching elements, 85, 86, 87, 88 and 90, and logic circuit 100, they also ensure that the operations of the drive mechanisms, 31 to 34, and the brake mechanisms, 51 and 52, are always initiated in the proper sequence. Care is also taken that during the course of an exposure, the operation cannot be disturbed by the input of additional commands. It is also advantageous that the windings of drive mechanisms 31 to 34 and brake mechanisms 51 and 52 are not provided with any current in rest position of the shutter mechanism, even if the electrical control circuitry is turned on, thereby saving electrical energy. Thus, it is practical to use dry batteries or similar compact and mobile current sources for the electrical supply of the shutter mechanism.

Of course, the electronic switching mechanism can be designed differently. Thus, for example, it is possible to do away with inverters 81, 82, 83 (FIG. 13) as well as inverters 126 and 127 (FIG. 14). The electronic control arrangement can be set up with other constructional elements, such as AND- and OR-gates, instead of with NOR- and NAND-gates (FIGS. 13 and 14). A combination of the various types of gating elements is also possible. A suitably programmed ROM or PROM can also be used for logic circuit 100.

The described design example of the shutter mechanism with two back and forth moving shutter elements, to which a pair of drive mechanisms are assigned operating in opposite directions, offers the significant advantage that the shutter need not be "tightened" before an exposure, i.e., that the shutter elements need not be brought into a predetermined starting position which is the same each time, as is necessary with the known "slot shutters" or other shutter mechanisms with spring drive. The present invention, however, can also be advantageously utilized in conjunction with other types of shutter mechanisms. Thus, for example, it is possible in the case of a shutter arrangement with two shutter elements, to which only one drive mechanism has been assigned, in order to be able to move the two shutter elements in succession with a pre-selected time interval in the same direction during an exposure, to assign one or two stationary operating position monitors to each shutter element, which control the shutting off of the appropriate drive mechanism or the starting up of an assigned brake mechanism. It is also possible in the case of a shutter mechanism with a set of actually simultaneously operating shutter elements or with only a single shutter element to provide one or two stationary operating position monitors, which monitor and control the movement of the shutter element. In each case, the position monitors can be actuated either by the assigned shutter mechanism itself or by a part moved in conjunction with it, e.g., the assigned drive mechanism. The drive mechanism need not be of an electromagnetic type in every case, but the invention also can be advantageously utilized with shutter mechanisms having a spring drive mechanism or a rotating drive motor. The brake mechanism could also be constructed such that their magnetic windings are excited when starting up the brake mechanism. There are also possible design forms of the shutter mechanism with which controlled braking mechanisms are dispensable.

The movement free operating position monitors need not be of the photoelectric type in all cases, as described in the above embodiments. The position monitors can just as well operate in response to a variance in magnetic-induction or capacitance.

If desired, the control circuitry shown in FIGS. 13 and 14 can be supplemented by additional circuitry in a relatively simple manner, such as an additional flip-flop circuit for preventing unintentional double exposures.

It is noted that the above description and the accompanying drawings are provided merely to present exemplary embodiments of the present invention and that additional modifications of such embodiments are possible within the scope of this invention without deviating from the spirit thereof.

We claim:

1. An electrically controlled shutter device for a photographic camera, the shutter device comprising:
   at least one shutter element mounted for movement between two rest positions for opening and closing a light admitting aperture of the camera;
   drive means operatively associated with said shutter element for causing the movement of said shutter element between its rest positions;
   external trigger control means for initiating an opening and closing of said aperture for an exposure operation and supplying electrical signals indicative of such operation;
   position monitoring means associated with said shutter element for providing a signal in dependence upon said shutter element being located at a predetermined position;
   braking means operatively associated with said shutter element; and,
   control means coupled to an output of said position monitoring means for controlling the operation of the shutter device as a function of signals provided by said position monitoring means and as a function of signals from said external trigger control means, and said control means being operatively coupled to said braking means for selectively controlling its operation as a function of a signal provided by said position monitoring means upon movement of said shutter element into a predetermined position.

2. A shutter device according to claim 1, wherein said shutter element is movable between first and second predetermined rest positions; said braking means is operatively associated with said shutter element for braking said shutter element when in one of said first and second positions; and said control means is operatively coupled with said drive means and said braking means so that prior to activation of said drive means for moving said shutter element from its first to its second position, said control means shuts off said braking means so as to release said shutter element from its first position and afterwards activates said braking means as a function of a signal provided by said position monitoring means upon movement of said shutter element into its second position.

3. A shutter device according to claim 2, wherein said control means includes means which, after each initiation of said drive means, shuts off said drive means as a function of a signal provided by said position monitoring means after said shutter element has moved by a predetermined distance, and said position monitoring means includes two position monitors coupled to said control means and operatively associated with said shutter element, one of said position monitors providing a signal to shut off said drive means and the other position monitors providing a signal to initiate the operation of said braking means.

4. A shutter device according to claim 1, wherein said position monitoring means is photoelectrically operated.

5. An electrically controlled shutter device for a photographic camera, the shutter device comprising:
   at least one shutter element mounted for movement between two rest positions for opening and closing a light admitting aperture of the camera;
   drive means operatively associated with said shutter element for causing the movement of said shutter element between its rest positions;
   external trigger control means for initiating an opening and closing of said aperture for an exposure operation and supplying electrical signals indicative of such operation;
   position monitoring means associated with said shutter element for providing a signal in dependence upon said shutter element being located at a predetermined position;
   control means coupled to an output of said position monitoring means for controlling the operation of the shutter device as a function of signals provided by said position monitoring means and as a function of signals from said external trigger control means, said control means including means which after each initiation of said drive means shuts said drive means off as a function of a signal provided by said position monitoring means after said shutter element has moved a predetermined distance such distance being substantially smaller than the stroke between the two rest positions of said shutter element.

6. An electrically controlled shutter device for a photographic camera, the shutter device comprising:
   at least one shutter element mounted for movement between first and second rest positions for opening and closing a light admitting aperture of the camera;
   drive means including two drive mechanisms operatively associated with said shutter element for alternately driving said shutter element from its first to its second rest position and from its second to its first rest position;
   external trigger control means for initiating an opening and closing of said aperture for an exposure operation and supplying electrical signals indicative of such operation;
   position monitoring means including two position monitors associated with said shutter element, one of said two position monitors being arranged to supply a signal when said shutter element is in one of said rest positions and the other of said position monitors being arranged to supply a signal when said shutter element is in the other of said rest positions;
   control means coupled to an output of each of said position monitors for controlling the operation of the shutter device as a function of signals provided by said position monitoring means and as a function of signals from said external trigger control means, said control means including means for alternately controlling said drive mechanisms for driving said shutter element in opposite directions as a function of signals provided by said position monitoring means.

7. A shutter device according to claim 6 further comprising another shutter element movable between corresponding first and second predetermined rest positions and braking means for braking said shutter elements in one of their respective positions; and wherein said braking means includes two braking mechanisms, each being operatively associated with one of said shutter elements, and said control means includes further means for selectively actuating one of said braking mechanisms as a function of a signal provided by said position monitoring means, when said shutter element associated with the respective said brake mechanism moves into one of its predetermined positions.

8. A shutter device according to claim 7, wherein said control means includes a flip-flop circuit coupled to said position monitoring means for controlling said drive mechanisms associated with said shutter elements as a function of signals provided by said position monitors.

9. A shutter device according to claim 6, further comprising another shutter element movable between corresponding first and second predetermined rest positions and braking means for braking said shutter elements in one of their respective positions; and wherein: there are two drive mechanisms, each being operatively associated with one of said shutter elements; said braking means includes two brake mechanisms, each being operatively associated with one of said shutter elements for braking such shutter element in one of its first and second predetermined positions; and said control means includes further means, which upon each initiation of one of said drive mechanisms for driving one of said shutter elements, stops the respective said braking mechanism from braking said shutter element in its first predetermined position and subsequently actuates said respective braking mechanism as a function of a signal provided by one of said position monitors, when said driven shutter element moves into its second predetermined position.

10. An electrically controlled shutter device for a photographic camera, the shutter device comprising:
two shutter elements each mounted for movement between corresponding first and second rest positions for opening and closing a light admitting aperture of the camera;
drive means including two drive mechanisms, each being operatively associated with one of said shutter elements, so that during an exposure period, said drive mechanisms being able to move each of said shutter elements in succession with a selected time interval from its first into its second position;
external trigger control means for initiating an opening and closing of said aperture for an exposure operation and supplying electrical signals indicative of such operation;
position monitoring means including two position monitors associated with said shutter elements for providing a signal in dependence upon said shutter element being located at a predetermined position;
braking means for braking said shutter elements in one of their respective positions includes two braking mechanisms, each being operatively associated with one of said shutter elements for braking such shutter element; and
control means coupled to an output of each said position monitor for controlling the operation of the shutter device as a function of signals provided by said position monitoring means and as a function of signals from said external trigger control means, said control means including means for selectively actuating said braking mechanisms as a function of a signal provided by one of said position monitors, when the corresponding said shutter element moves into its second predetermined position.

11. A shutter device according to claim 10, wherein each said braking mechanism brakes the corresponding said shutter element both in its first and second positions; and said further means of said control means, upon initiation of any of said drive mechanisms for driving one of said shutter elements, turns off said braking mechanism associated with such shutter element in its first predetermined position and subsequently reactuates said braking mechanism as a function of a signal provided by one of said position monitors with the movement of said driven shutter element into its second predetermined position.

12. A shutter device according to claim 11, wherein said control means includes further means which after actuation of each of said drive mechanisms shuts off such drive mechanism as a function of a signal provided by one of said position monitors after said shutter element has moved a predetermined distance.

13. A shutter device according to claim 12, wherein one of said position monitors provides a signal to turn off a respective said drive mechanism and the other of said position monitors provides a signal to actuate a respective said braking mechanism.

14. A shutter device according to claim 10, wherein said position monitoring means includes a total of three position monitors, the first position monitor being exclusively associated with one of said shutter elements, the second position monitor being exclusively associated with the other said shutter element and the third position monitor being associated with both of said shutter elements.

15. An electrically controlled shutter device for a photographic camera, the shutter device comprising:
two shutter elements each movable between corresponding first and second predetermined rest positions;
external trigger control means for initiating an opening and closing of said aperture for an exposure operation and supplying electrical signals indicative of such operation;
drive means including a first pair of drive mechanisms operatively associated with said shutter elements for moving them back and forth in succession in one direction from the first into the second rest position with a selected time interval for an exposure operation and a second pair of drive mechanisms for moving said shutter elements in succession in an opposite direction from the second into the first rest position with a selected time interval for an exposure operation;
position monitoring means including two position monitors operatively associated with said shutter elements for providing signals in dependence upon said shutter elements being located in predetermined positions; and,
control means including means for controlling said drive mechanisms alternately in pairs for moving said shutter elements positions, in response to signals provided by said position monitors and said external trigger control means.

16. A shutter device according to claim 15, further comprising two brake mechanisms, each being operatively associated with one of said shutter elements for braking the corresponding said shutter element both when in its first and in its second rest position; and wherein said control means includes additional means, which with each initiation of any of said drive mechanisms for movement of one of said shutter elements, deactuates the corresponding said braking mechanism and subsequently reactuates said braking mechanism as a function of signals provided by said position monitors with movement of said driven shutter element into one of its rest positions.

17. A shutter device according to claim 16, wherein said control means includes further means, which after initiation of any of said drive mechanisms for movement of one of said shutter elements, shuts off such drive mechanisms as a function of a signal provided by one of said position monitors after said driven shutter element has been moved a predetermined distance.

18. A shutter device according to claim 17, wherein each of said two position monitors is operatively associated with only one of said shutter elements and said position monitoring means further includes a third position monitor operatively associated with both of said shutter elements, said position monitors associated with each respective said shutter element alternately providing a signal to deactuate the corresponding said drive mechanism and a signal to initiate the corresponding said brake mechanism.

19. A shutter device according to claim 15, wherein said position monitoring means includes a total of three position monitors, the first position monitor being exclusively associated with one of said shutter elements, the second position monitor being exclusively associated with the other said shutter element and the third position monitor being associated with both of said shutter elements.

20. A shutter device according to claim 15, wherein said control means includes a flip-flop circuit coupled to said position monitoring means for controlling said drive mechanisms associated with shutter elements as a function of signals provided by said position monitors.

21. A shutter device according to claim 15, wherein said control means includes electronic logic switching means for controlling all four of said drive mechanisms in cyclical sequence as a function of signals provided by said position monitors.

* * * * *